United States Patent
Yamamoto et al.

(10) Patent No.: US 11,360,586 B2
(45) Date of Patent: Jun. 14, 2022

(54) COMMUNICATION METHOD EXECUTED BETWEEN ACTIVE PEN AND SENSOR CONTROLLER, AND ACTIVE PEN

(71) Applicant: Wacom Co., Ltd., Saitama (JP)

(72) Inventors: Sadao Yamamoto, Saitama (JP); Yasuo Oda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 66 days.

(21) Appl. No.: 16/836,494

(22) Filed: Mar. 31, 2020

(65) Prior Publication Data

US 2020/0225773 A1 Jul. 16, 2020

Related U.S. Application Data

(63) Continuation of application No. PCT/JP2017/042777, filed on Nov. 29, 2017.

(51) Int. Cl.
*G06F 3/041* (2006.01)
*G06F 3/038* (2013.01)
*G06F 3/0354* (2013.01)

(52) U.S. Cl.
CPC ........ *G06F 3/0383* (2013.01); *G06F 3/03545* (2013.01); *G06F 3/04162* (2019.05); *G06F 2203/0382* (2013.01)

(58) Field of Classification Search
None
See application file for complete search history.

(56) References Cited

U.S. PATENT DOCUMENTS

| 10,108,277 | B2 | 10/2018 | Oda et al. |
| 2015/0153845 | A1* | 6/2015 | Chang ............... G06F 3/0441 345/179 |
| 2016/0246390 | A1 | 8/2016 | Lukanc et al. |
| 2016/0306447 | A1 | 10/2016 | Fleck et al. |

(Continued)

FOREIGN PATENT DOCUMENTS

| JP | 5442479 B2 | 3/2014 |
| JP | 6230755 B2 | 11/2017 |
| TW | I597645 B | 9/2017 |

OTHER PUBLICATIONS

International Search Report, dated Jan. 16, 2018, for International Application No. PCT/JP2018/042777, 1 page.
(Continued)

*Primary Examiner* — Brian M Butcher
(74) *Attorney, Agent, or Firm* — Seed IP Law Group LLP

(57) ABSTRACT

A sensor controller is provided which is capable of allocating time slots to multiple active pens in a timely manner according to functions of each active pen. The sensor controller, in operation, supplies a beacon signal, which serves as a reference time for a frame formed of a plurality of time slots; acquires, from a downlink signal returned from one of a first active pen including a pen tip electrode and a second active pen including a pen tip electrode and a peripheral electrode in response to the beacon signal, functional information indicating whether or not one of the active pens that has transmitted the downlink signal includes the peripheral electrode; and determines based on the acquired functional information whether to allocate one or more of the time slots to only the pen tip electrode or to each of the pen tip electrode and the peripheral electrode.

21 Claims, 19 Drawing Sheets

(56) References Cited

U.S. PATENT DOCUMENTS

| | | | |
|---|---|---|---|
| 2017/0262122 A1* | 9/2017 | Chang | G06F 3/04166 |
| 2018/0024658 A1 | 1/2018 | Yamamoto et al. | |
| 2018/0095554 A1 | 4/2018 | Yeh | |
| 2018/0113559 A1* | 4/2018 | Bae | G06F 3/0412 |
| 2018/0120959 A1* | 5/2018 | Mao | G06F 3/0383 |
| 2018/0129305 A1* | 5/2018 | Fleck | G06F 3/03545 |
| 2018/0343079 A1* | 11/2018 | Imanilov | H04L 63/0428 |

OTHER PUBLICATIONS

Partial European Search Report, dated Oct. 26, 2020, for European Application No. 17933372.9, 17 pages.

* cited by examiner

|  |  | POSITION DETECTION | INCLINATION AND AZIMUTH DETECTION | ROTATION ANGLE DETECTION | |
|---|---|---|---|---|---|
|  |  |  |  | R1 | R2 |
| 2A | 21 | + | | | |
| 2B | 21 | + | (+) | | |
|  | 22a | (−) | + | | |
| 2C | 21 | + | (+) | (+) | (+) |
|  | 22b | (−) | + | + | (−) |
|  | 22c | (−) | + | (−) | + |

NOTE: SIGNAL IN PARENTHESES NEED NOT BE TRANSMITTED

FIG.9
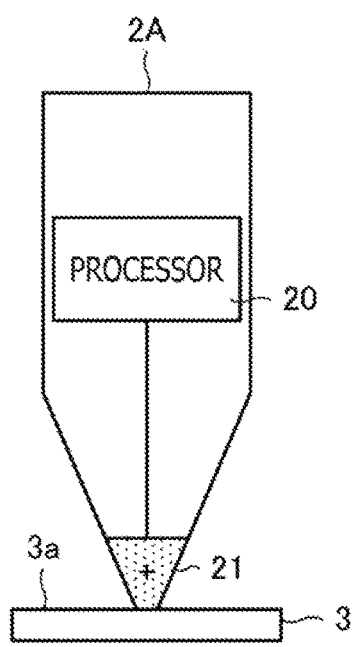
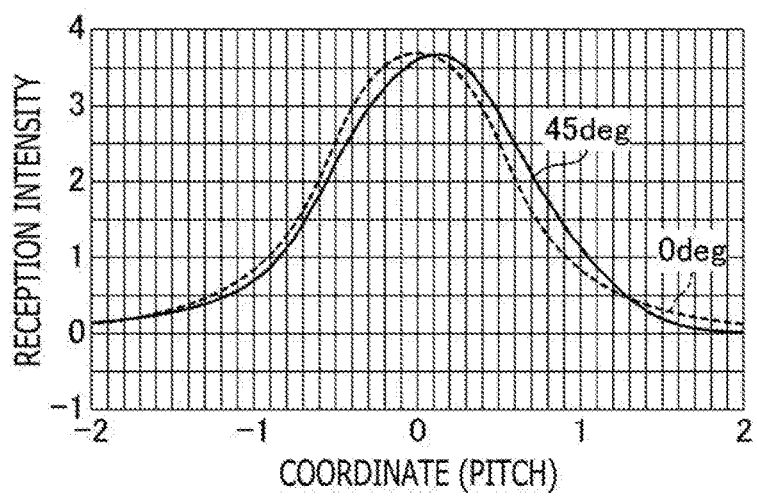
FIG.10
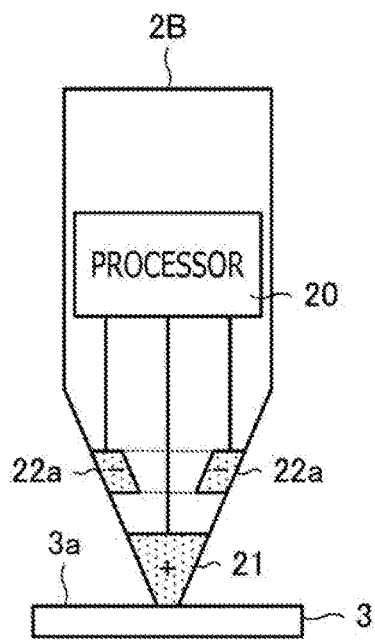
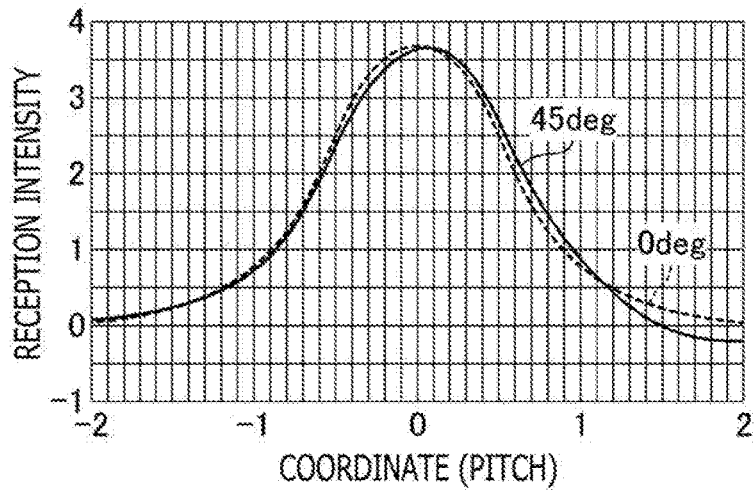

FIG.11
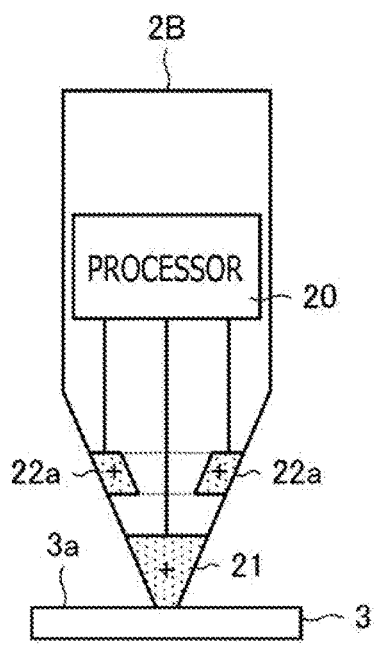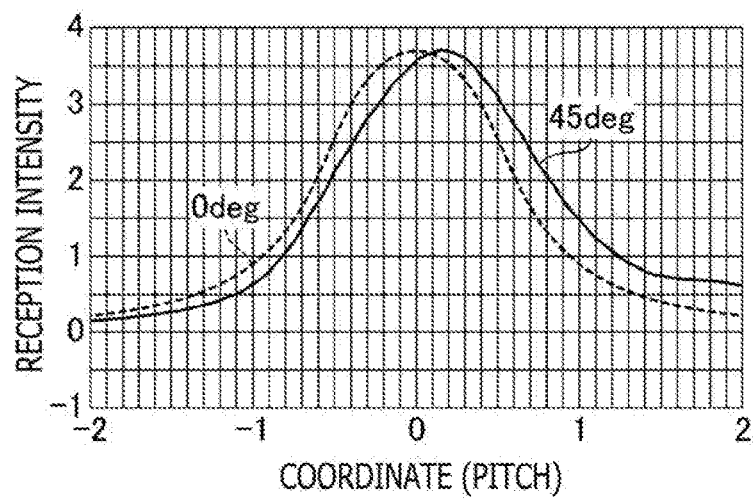

FIG.12A
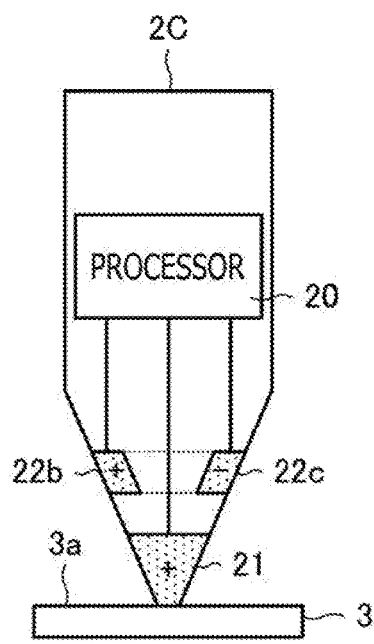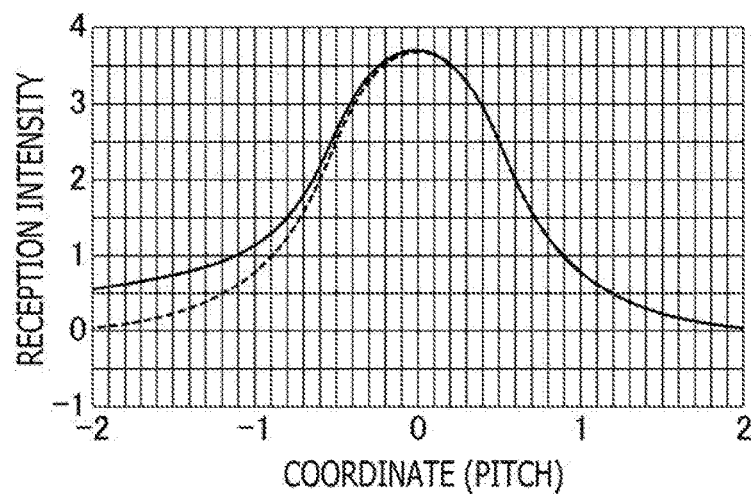
FIG.12B
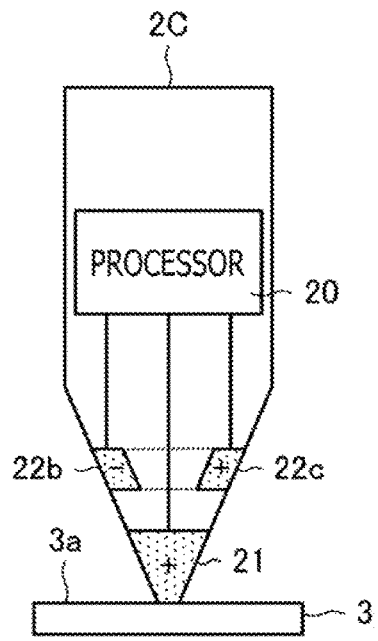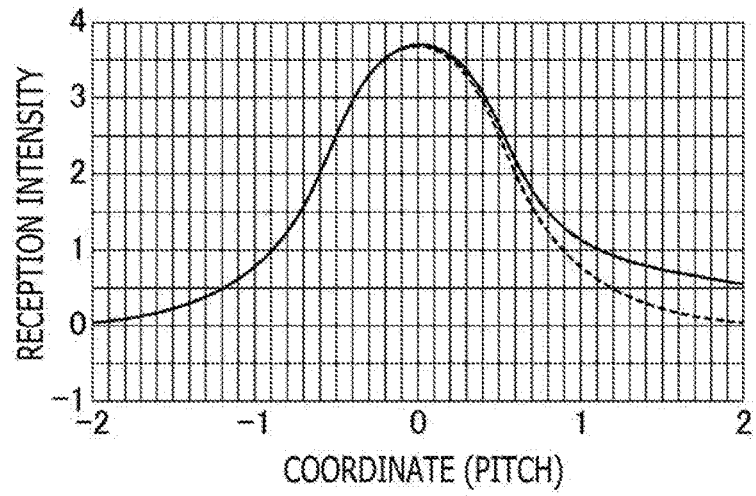

FIG. 17

| INDEX | BEACON | RESPONSE | $S_0$ | | | ... | $S_k$ | | | ... | $S_{2k}$ | | | ... | REMAINDER |
|---|---|---|---|---|---|---|---|---|---|---|---|---|---|---|---|
| 0 | | | P | | | | P | | | | P | | | | |
| 1 | | | | P | | | | P | | | | P | | | |
| 2 | | | | | P | | | | P | | | | P | | |
| ... | | | | | | | | | | | | | | | |
| k | | | P|T | | | | P|T | | | | P|T | | | |
| k+1 | | | | P|T | | | | P|T | | | | P|T | | |
| k+2 | | | | | P|T | | | | P|T | | | | P|T | | |
| ... | | | | | | | | | | | | | | | |
| 2k | | | P|T|R1|R2 | | | | P|T|R1|R2 | | | | P|T|R1|R2 | | | |
| 2k+1 | | | | P|T|R1|R2 | | | | P|T|R1|R2 | | | | P|T|R1|R2 | | |
| 2k+2 | | | | | P|T|R1|R2 | | | | P|T|R1|R2 | | | | P|T|R1|R2 | |
| 2k+3 | | | | | | | | | | | | | | | |
| ... | | | | | | | | | | | | | | | |

POSITION (indices 0…k)

INCLINATION AND AZIMUTH, POSITION (indices k+1…2k)

ROTATION ANGLE, INCLINATION AND AZIMUTH, POSITION (indices 2k+1…)

FRAME / TIME SLOT

FIG. 18

| INDEX | BEACON RESPONSE | $S_0$ | ... | $S_k$ | ... | $S_{2k}$ | ... | REMAINDER |
|---|---|---|---|---|---|---|---|---|
| 0 | | P | | P | | P | | |
| 1 | | P | P | P | P | P | | |
| 2 | | P | P | P | P | P | | |
| ... | | | | | | | | |
| k | | P | | T | | P | | |
| k+1 | | P | P | T | T | P | | |
| k+2 | | P | P | T | T | P | | |
| ... | | | | | | | | |
| 2k | | P | | T | | R1 | | |
| 2k+1 | | P | P | T | T | R1 | | |
| 2k+2 | | P | P | T | T | R1 | | |
| 2k+3 | | P | P | T | T | R1 | | |
| ... | | | | | | | | |

Columns grouped as: POSITION | INCLINATION AND AZIMUTH, POSITION | ROTATION ANGLE, INCLINATION AND AZIMUTH, POSITION

FRAME / TIME SLOT

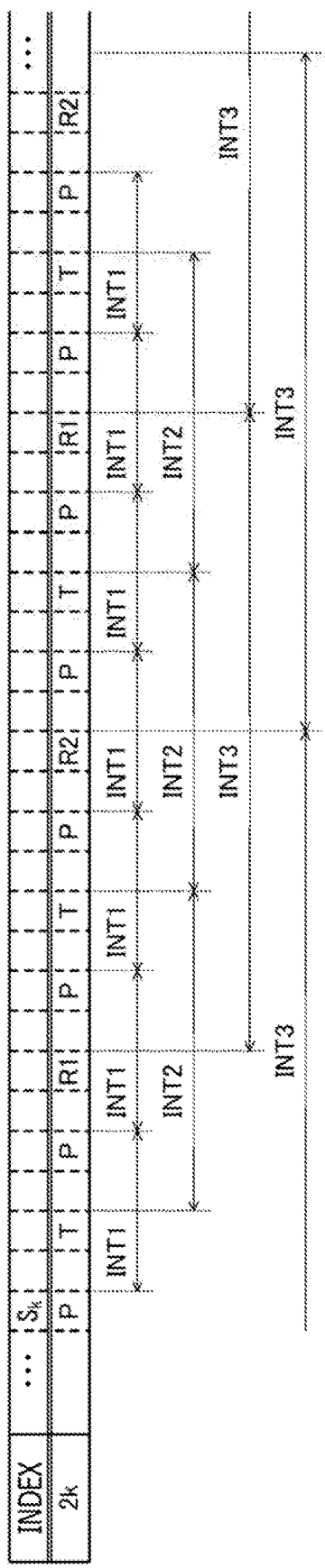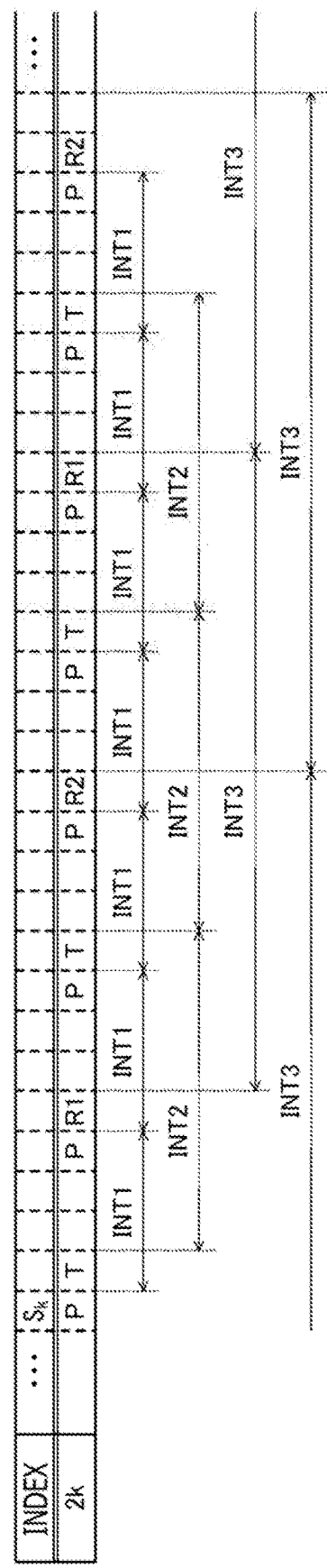

FIG. 20

COMMUNICATION METHOD EXECUTED BETWEEN ACTIVE PEN AND SENSOR CONTROLLER, AND ACTIVE PEN

BACKGROUND

Technical Field

The present disclosure relates to a communication method executed between an active pen and a sensor controller, and to an active pen.

Description of the Related Art

An example of a system that realizes pen input in a tablet terminal or the like includes a system using an active pen with a built-in power supply. The active pen can be capacitively coupled to sensor electrodes provided on a panel surface (touch surface) of the tablet terminal to thereby transmit and receive signals to and from a sensor controller in the tablet terminal.

Examples of the system using the active pen are disclosed in Patent Documents 1 and 2. According to the examples, the sensor controller and the active pen use a frame including a plurality of time slots to communicate with each other. Note that the "time slot" in the present specification denotes a unit of communication specified by a temporal position in the frame. The sensor controller described in Patent Document 1 is configured to use the time slot positioned at the top of each frame to transmit a beacon signal for designating time slots to be used by the active pen to transmit downlink signals. In addition, the sensor controller described in Patent Document 2 is configured to use a similar beacon signal to designate, for each of a plurality of active pens, time slots to be used for transmitting downlink signals.

In addition, among the systems using the active pens, there is a system in which a cylindrical peripheral electrode is arranged to surround a pen tip electrode in an active pen such that signals transmitted from these electrodes can be used to detect the inclination of the active pen. An example of such a system is disclosed in Patent Document 3.

PRIOR ART DOCUMENT

Patent Documents

Patent Document 1: Japanese Patent No. 6230755
Patent Document 2: U.S. Patent Application Publication No. 2016/0246390
Patent Document 3: Japanese Patent No. 5442479

BRIEF SUMMARY

Technical Problems

However, how the sensor controller discerns the situation of the active pen currently on the panel surface is not described in the Patent Documents. As a result, according to the conventional systems, it is difficult to monitor the situation in which one or more active pens with different functions frequently come in and out of the sensor range, and it is difficult to allocate time slots in a timely manner according to the functions and capabilities of each active pen (e.g., according to the number of electrodes included in each active pen, whether or not each active pen supports detection of inclination $\theta$, azimuth $\varphi$, and/or rotation angle $\psi$, etc.).

Therefore, an aspect of the present disclosure is directed to providing a communication method that is executed between active pens and a sensor controller and that can provide time slots in a timely manner according to functions of each active pen.

In addition, the conventional systems using the active pens have a problem that when the active pen is tilted with respect to the panel surface, the peak of the reception intensity distribution of downlink signals on the panel surface is shifted in the inclination direction, and the position detected by the sensor controller becomes inaccurate.

Therefore, another aspect of the present disclosure is directed to providing an active pen in which the sensor controller can accurately detect the instruction position even when the active pen is tilted with respect to the panel surface.

Furthermore, the conventional systems using the active pens have a problem that when, for example, the hand of the user holding the active pen is touching the panel surface, a portion of the downlink signal flowing in the sensor electrode flows in the direction of the hand of the user. As a result, the sensor controller may falsely detect the contact position of the hand as the instruction position of the active pen.

Therefore, yet another aspect of the present disclosure is directed to providing an active pen that can prevent the sensor controller from falsely detecting the contact position of the hand as the instruction position of the active pen.

Technical Solution

The present disclosure provides a communication method executed between an active pen and a sensor controller, wherein the communication method is executed between: one of a first active pen including a pen tip electrode and a second active pen including a pen tip electrode and a peripheral electrode; and a sensor controller connected to a sensor electrode. The communication method includes: a beacon signal supply step in which the sensor controller supplies a beacon signal to serve as a reference time for a frame formed of a plurality of time slots; a functional information acquisition step in which the sensor controller acquires, from a downlink signal returned from one of the first active pen and the second active pen in response to the beacon signal, functional information indicating whether or not one of the active pens that has transmitted the downlink signal includes the peripheral electrode; and an allocation determination step in which the sensor controller determines based on the acquired functional information whether to allocate one or more of the time slots to only the pen tip electrode or to allocate one or more of the time slots to each of the pen tip electrode and the peripheral electrode.

The present disclosure provides an active pen that transmits, through coupling capacitance, a signal to a sensor electrode connected to a sensor controller. The active pen includes: a pen tip electrode provided on a leading end in a pen axis direction of the active pen; a peripheral electrode provided behind in the pen axis direction as viewed from the pen tip electrode; and a signal processor that transmits a downlink signal from the pen tip electrode and that transmits a reverse-phase signal of the downlink signal from the peripheral electrode at the same time.

Advantageous Effect

According to the communication method executed between the active pen and the sensor controller of the present disclosure, the sensor controller can allocate time slots to electrodes (per electrode), according to the number of electrodes of each of one or more detected active pens. Thus, the time slots can be provided in a timely manner according to the functions and capabilities of each active pen.

According to the active pen of the present disclosure, the intensity of the downlink signal in the direction of the tilt of the active pen can be selectively reduced, and the sensor controller can correctly detect the instruction position of the active pen which may be tilted with respect to the panel surface. In addition, the peripheral electrode can absorb the downlink signal otherwise absorbed by the hand of the user, to thereby prevent the sensor controller from falsely detecting the contact position of the hand as the instruction position of the active pen.

BRIEF DESCRIPTION OF THE SEVERAL VIEWS OF THE DRAWINGS

FIG. 9 is a diagram illustrating a reception intensity distribution on a panel surface 3a when an active pen 2A transmits a burst signal from a pen tip electrode 21.

FIG. 10 is a diagram illustrating a reception intensity distribution on the panel surface 3a when the active pen 2B transmits the burst signal from the pen tip electrode 21 and transmits a reverse-phase signal of the burst signal from the peripheral electrode 22a at the same time.

FIG. 11 is a diagram illustrating a reception intensity distribution on the panel surface 3a when the active pen 2B transmits the burst signal from each of the pen tip electrode 21 and the peripheral electrode 22a.

FIG. 12A is a diagram illustrating a reception intensity distribution on the panel surface 3a in step R1 illustrated in FIG. 5, and FIG. 12B is a diagram illustrating a reception intensity distribution on the panel surface 3a in step R2 illustrated in FIG. 5.

FIG. 14 is a diagram illustrating an equivalent circuit similar to FIG. 13B regarding a case in which the active pen 2B transmits a reverse-phase signal of a downlink signal DS from the peripheral electrode 22a.

FIG. 17 is a diagram illustrating an example of multiple sets of predefined setting information.

FIG. 18 is a diagram illustrating a first modification to the predefined setting information.

FIG. 19A is a diagram illustrating a second modification to the predefined setting information, and FIG. 19B is a diagram illustrating a modification to the second modification illustrated in FIG. 19A.

FIG. 20 is a diagram illustrating a third modification to the predefined setting information.

DETAILED DESCRIPTION

Hereinafter, embodiments of the present disclosure will be described in detail with reference to the attached drawings.

Figure 1A:
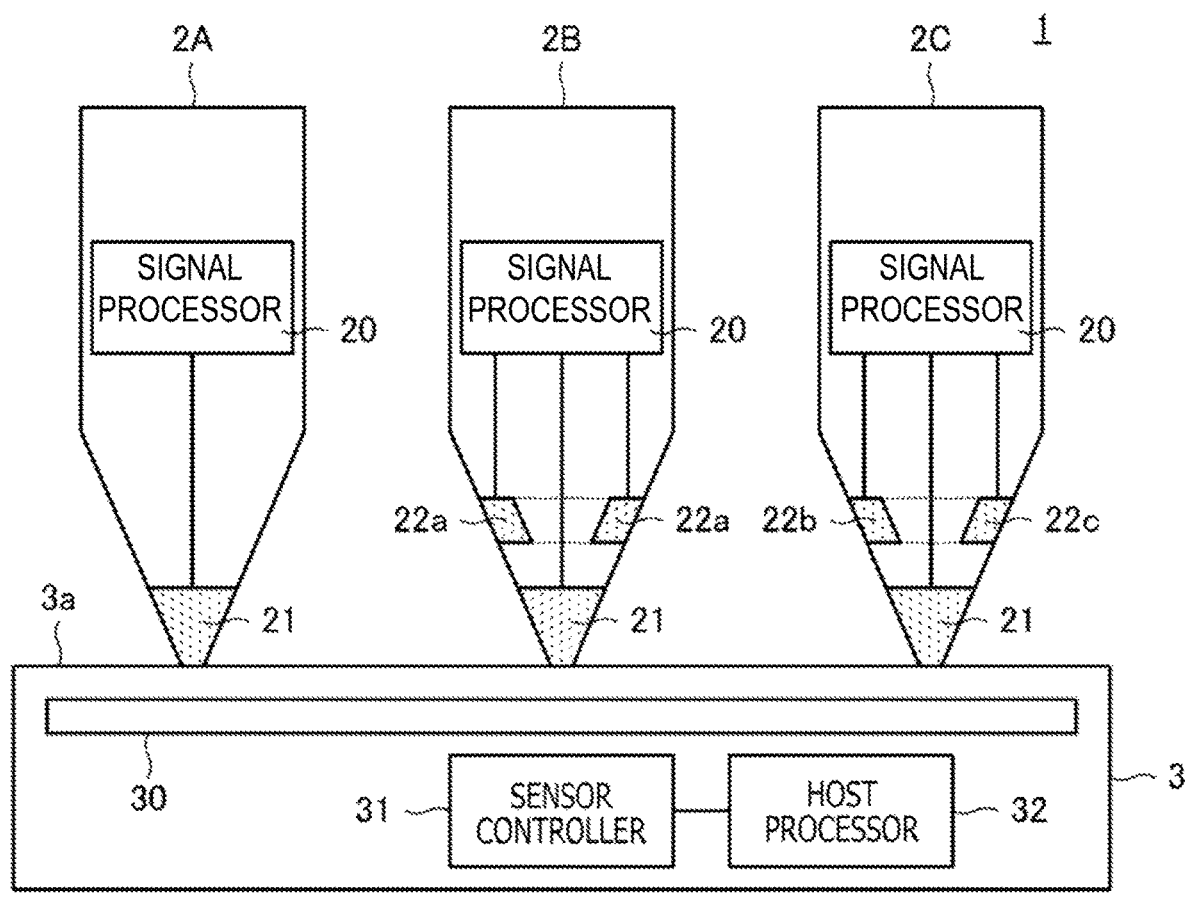
FIG. 1A is a diagram illustrating an overall configuration of a position detection system 1 according to an embodiment of the present disclosure.

FIG. 1A is a diagram illustrating an overall configuration of a position detection system 1 according to an embodiment. As illustrated in FIG. 1A, the position detection system 1 includes three types of active pens 2A to 2C, and a tablet terminal 3.

Each of the active pens 2A to 2C is a pen-type apparatus that transmits and receives, through coupling capacitance, signals to and from a sensor electrode group 30 connected to a sensor controller 31 in the tablet terminal 3, and each of the active pens 2A to 2C includes a signal processor 20. The active pens 2A to 2C vary in the number, the shape, and the arrangement of electrodes. In the following description, the active pens 2A to 2C will be collectively referred to as active pens 2 when the active pens 2A to 2C do not have to be particularly distinguished from each other.

The active pen 2A includes a pen tip electrode 21 provided at a leading end in a pen axis direction. The signal processor 20 of the active pen 2A uses the pen tip electrode 21 as an antenna to transmit and receive signals to and from the sensor controller 31.

The active pen 2B includes the pen tip electrode 21 provided at the leading end in the pen axis direction and a peripheral electrode 22a provided behind in the pen axis direction as viewed from the pen tip electrode 21. The signal processor 20 of the active pen 2B uses either one or both of the pen tip electrode 21 and the peripheral electrode 22a as antennas to transmit and receive signals to and from the sensor controller 31.

The active pen 2C includes the pen tip electrode 21 provided at the leading end in the pen axis direction and peripheral electrodes 22b and 22c provided behind in the pen axis direction as viewed from the pen tip direction 21. The signal processor 20 of the active pen 2C uses any one, two, or three of the pen tip electrode 21 and the peripheral electrodes 22b and 22c as antennas to transmit and receive signals to and from the sensor controller 31.

Figure 1B:
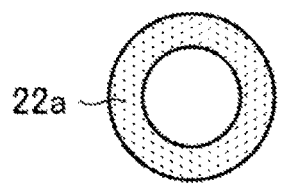
FIG. 1B is a top view of a peripheral electrode 22a as viewed from a distal end side of an active pen 2B.
Figure 1C:
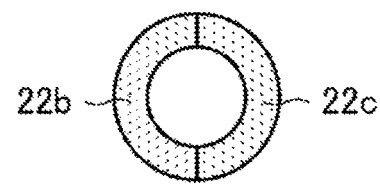
FIG. 1C is a top view of peripheral electrodes 22b and 22c as viewed from a distal end side of an active pen 2C.

FIG. 1B is a top view of the peripheral electrode 22a as viewed from the distal end side of the active pen 2B, and FIG. 1C is a top view of the peripheral electrodes 22b and 22c as viewed from the distal end side of the active pen 2C. As illustrated in FIG. 1B, the peripheral electrode 22a is formed in a ring shape, and the pen axis extends through the center of the peripheral electrode 22a. In other words, the peripheral electrode 22a has an isotropic shape with respect to the rotation about the pen axis. As illustrated in FIG. 1C, the peripheral electrodes 22b and 22c are equivalent to two fragments (a plurality of segmented electrodes) obtained by segmenting the peripheral electrode 22a into two parts along a plane including the pen axis. In other words, the peripheral electrodes 22b and 22c have anisotropic shapes with respect to the rotation about the pen axis.

The tablet terminal 3 includes the sensor electrode group 30, the sensor controller 31, and a host processor 32. Although not illustrated, the tablet terminal 3 is also provided with a display apparatus including a display surface arranged on top of the sensor electrode group 30. A panel surface 3a of the tablet terminal 3 includes the display surface of the display apparatus.

The sensor electrode group 30 includes a plurality of conductors (sensor electrodes 30X and 30Y illustrated in FIG. 3 to be described later) arranged to overlap the display surface of the display apparatus. The sensor electrode group 30 is provided over the entire panel surface 3a, and this allows to detect the position of an indicator, such as the active pen 2 and a finger of the user, over the entire panel surface 3a.

The sensor controller 31 is an apparatus that uses the sensor electrode group 30 to detect the position (x, y) of the indicator, such as the active pen 2 and the finger of the user, in the panel surface 3a and to receive the data transmitted from the active pen 2. As described in detail later, the sensor controller 31 further detects, for the active pens 2B and 2C, an inclination θ with respect to the panel surface 3a and an azimuth φ indicating the direction of the inclination. In addition, the sensor controller 31 also detects a rotation angle ψ about the pen axis for the active pen 2C. The sensor controller 31 is configured to output, to the host processor 32, the detected position (x, y), inclination θ, azimuth φ, and rotation angle ψ and the data received from the active pen 2.

The host processor 32 is an apparatus that controls the entire tablet terminal 3 including the sensor controller 31 and the display apparatus. Processes executed by the host processor 32 include a process of rendering ink data based on the position (x, y), the inclination θ, the azimuth φ, and the rotation angle ψ supplied from the sensor controller 31 as well as based on the transmission data of the active pen 2, and causing the display apparatus to display the result of rendering.

Figure 2:
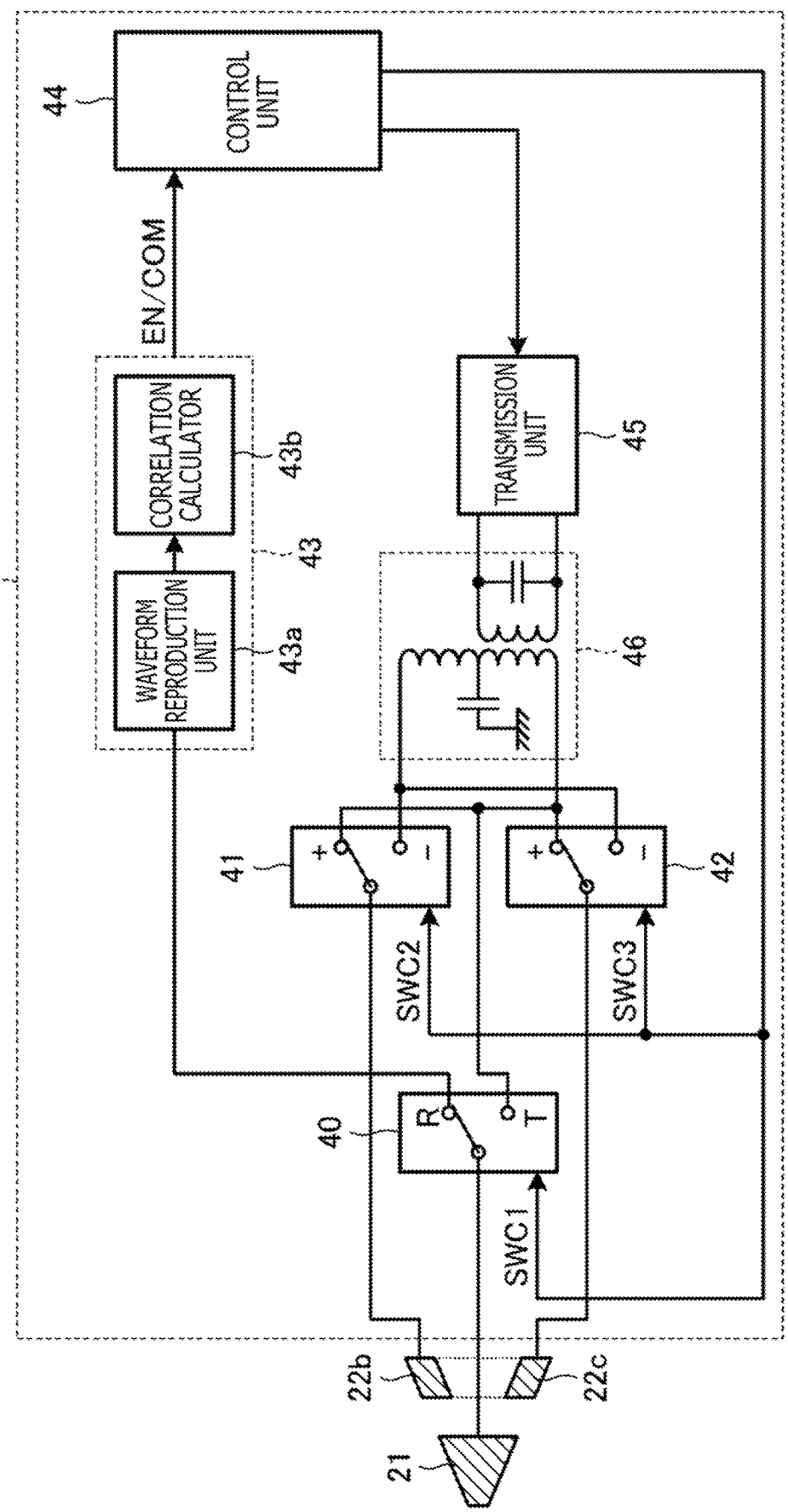
FIG. 2 is a diagram illustrating an internal configuration of the active pen 2C.

FIG. 2 is a diagram illustrating an internal configuration of the active pen 2C. In the following description of the active pen 2C, configurations of the active pens 2A and 2B will also be described.

The pen tip electrode 21 is a conductor that plays a role of an antenna for transmitting a downlink signal DS and that also plays a role of an antenna for receiving a beacon signal BS transmitted from the sensor controller 31 through the sensor electrode group 30. Note that a piece that forms the pen tip may be provided separately from the pen tip electrode 21. In addition, an electrode that receives the beacon signal BS may be provided separately from the pen tip electrode 21.

The peripheral electrodes 22b and 22c are conductors that play a role of antennas for transmitting the downlink signal DS. As described in detail later, the signal processor 20 can transmit the downlink signal DS or a reverse-phase signal of the downlink signal DS from either of the peripheral electrodes 22b and 22c. In other words, the signal processor 20 can individually switch each of the peripheral electrodes 22b and 22c to transmit the downlink signal DS or to transmit the reverse-phase signal of the downlink signal DS.

The signal processor 20 has a function of starting or stopping the downlink signal DS or the reverse-phase signal of the downlink signal DS from each of the pen tip electrode 21 and the peripheral electrodes 22b and 22c according to a predetermined trigger. In the present embodiment, the predetermined trigger is provided by the beacon signal BS transmitted from the sensor controller 31. More specifically, the signal processor 20 starts or stops the downlink signal DS or the reverse-phase signal of the downlink signal DS from either of the pen tip electrode 21 and the peripheral electrodes 22b and 22c according to a transmission schedule indicated by setting information (described later) included in the beacon signal BS.

The signal processor (or signal processing circuitry) 20 includes switching units 40 to 42, a detection unit 43, a control unit 44, a transmission unit 45, and a reverse-phase signal generation unit 46. Hereinafter, these units will be sequentially described.

The switching unit 40 is a single-pole double-throw switching element in which a common terminal and either one of a T terminal and an R terminal are connected. The common terminal of the switching unit 40 is connected to the pen tip electrode 21. The T terminal is connected to a normal-phase signal output terminal of the reverse-phase signal generation unit 46, and the R terminal is connected to an input terminal of the detection unit 43. The state of the switching unit 40 is controlled by a control signal SWC1 from the control unit 44. To receive the beacon signal BS from the sensor controller 31, the control unit 44 uses the control signal SWC1 to control the switching unit 40 to connect the R terminal and the common terminal. To transmit the downlink signal DS from the pen tip electrode 21 to the sensor controller 31, the control unit 44 uses the control signal SWC1 to control the switching unit 40 to connect the T terminal and the common terminal.

The switching unit 41 is a single-pole double-throw switching element in which a common terminal and either one of a positive terminal and a negative terminal are connected. The common terminal of the switching unit 41 is connected to the peripheral electrode 22b. The positive terminal is connected to the normal-phase signal output terminal of the reverse-phase signal generation unit 46, and the negative terminal is connected to a reverse-phase signal output terminal of the reverse-phase signal generation unit 46. The state of the switching unit 41 is controlled by a control signal SWC2 from the control unit 44. To transmit the downlink signal DS from the peripheral electrode 22b to the sensor controller 31, the control unit 44 uses the control signal SWC2 to control the switching unit 41 to connect the positive terminal and the common terminal. To transmit the reverse-phase signal of the downlink signal DS from the peripheral electrode 22b to the sensor controller 31, the control unit 44 uses the control signal SWC2 to control the switching unit 41 to connect the negative terminal and the common terminal.

The switching unit 42 is a single-pole double-throw switching element in which a common terminal and either one of a positive terminal and a negative terminal are connected. The common terminal of the switching unit 42 is connected to the peripheral electrode 22c. The positive terminal is connected to the normal-phase signal output terminal of the reverse-phase signal generation unit 46, and the negative terminal is connected to the reverse-phase signal output terminal of the reverse-phase signal generation unit 46. The state of the switching unit 42 is controlled by a control signal SWC3 from the control unit 44. To transmit the downlink signal DS from the peripheral electrode 22c to the sensor controller 31, the control unit 44 uses the control signal SWC3 to control the switching unit 42 to connect the positive terminal and the common terminal. To transmit the reverse-phase signal of the downlink signal DS from the peripheral electrode 22c to the sensor controller 31, the control unit 44 uses the control signal SWC3 to control the switching unit 42 to connect the negative terminal and the common terminal.

The configurations of the active pens 2A and 2B will be described. The active pen 2A does not include the switching units 41 and 42 and the reverse-phase signal generation unit 46, and an output terminal of the transmission unit 45 is directly connected to the T terminal of the switching unit 40. The active pen 2B does not include the switching unit 42, and the common terminal of the switching unit 41 is connected to the peripheral electrode 22a.

The detection unit 43 is a circuit that detects a signal supplied from the switching unit 40 (signal arriving at the pen tip electrode 21) and that decodes a code sequence included in the detected signal. The detection unit 43 includes a waveform reproduction unit 43a and a correlation calculator 43b. Through the decoding, the detection unit 43 detects the beacon signal BS.

The waveform reproduction unit 43a binarizes the level of the charge (voltage) induced in the pen tip electrode 21, using a clock at a rate several times (for example, four times) the chip rate of the spreading code used by the sensor controller 31 to spread the beacon signal BS. The waveform reproduction unit 43a shapes a binary sequence (chip sequence) of positive and negative polarity values and outputs the binary sequence. The correlation calculator 43b stores the chip sequence output by the waveform reproduction unit 43a in a register and performs a correlation operation with each of a plurality of spreading codes that may be transmitted from the sensor controller 31 using the clock to sequentially shift the chip sequence. In this way, the correlation calculator 43b decodes the chip sequence included in the reception signal into a format of symbols.

Here, the symbol is a unit of information associated with one spreading code, and the symbols include a symbol D corresponding to the bit sequence and a symbol P not corresponding to the bit sequence. The beacon signal BS includes a preamble PRE for causing the active pen 2 to detect the beacon signal BS and a command COM indicating an instruction for the active pens 2, and the preamble PRE and the command COM are included in this order. The preamble PRE includes two consecutive symbols P, and the command COM includes four consecutive symbols D.

The detection unit 43 successively performs a detection operation of the preamble PRE based on the decoding result of the correlation calculator 43b. Specifically, the detection operation is an operation for determining whether or not two consecutive symbols P are acquired. When the detection unit 43 detects the existence of the sensor controller 31 by detecting the preamble PRE, the detection unit 43 issues, to the control unit 44, a start signal EN for starting the control unit 44 and then performs a detection operation of the command COM. Specifically, the detection unit 43 sequentially demodulates the series of symbols D, which are sequentially obtained by decoding, to a bit sequence. The detection unit 43 ultimately obtains a bit sequence of a predetermined number of bits and outputs the bit sequence to the control unit 44.

The transmission unit 45 is a circuit that generates the downlink signal DS according to the control of the control unit 44 and that supplies the downlink signal DS to the reverse-phase signal generation unit 46. The downlink signal DS generated by the transmission unit 45 includes a response signal transmitted just after the reception of the beacon signal BS and an in-slot signal transmitted in a time slot to be described later. The response signal includes a burst signal, which is a non-modulated carrier signal, and a data signal, which is a carrier signal modulated based on data transmitted from the active pen 2C to the sensor controller 31. The data transmitted to the sensor controller 31 includes functional information indicating the number, the shape, and the arrangement of electrodes provided in the active pen 2C. On the other hand, the in-slot signal includes a burst signal that is a non-modulated carrier signal.

The reverse-phase signal generation unit 46 is a circuit that generates a reverse-phase signal obtained by inverting the phase of the downlink signal DS. The reverse-phase signal generation unit 46 includes the normal-phase signal output terminal that outputs the downlink signal DS and the reverse-phase signal output terminal that outputs the reverse-phase signal of the downlink signal DS.

The control unit 44 includes a read-only memory (ROM) and a random-access memory (RAM) inside, and is a microprocessor that operates by executing programs stored in the ROM and the RAM. The control unit 44 is activated by the supply of the start signal EN from the detection unit 43. The activated control unit 44 performs an operation according to the command COM supplied from the detection unit 43. The operation includes a process of outputting the downlink signal DS to the transmission unit 45 and a process of using the control signals SWC1 to SWC3 to control the switching units 40 to 42.

The control unit 44 stores a flag that is true when the sensor controller 31 is detected and that is false when the sensor controller 31 is not detected. The control unit 44 receiving the command COM when the flag is false transmits a response signal from the pen tip electrode 21 just after the start signal EN is supplied from the detection unit 43. Specifically, the control unit 44 causes the transmission unit 45 to output the response signal and uses the control signals SWC1 to SWC3 to connect the pen tip electrode 21 to the normal-phase signal output terminal of the reverse-phase signal generation unit 46. The control unit 44 can transmit the response signal in this way to cause the sensor controller 31 to detect the active pen 2C and notify the sensor controller 31 of the functional information of the active pen 2C. The control unit 44, along with transmitting the response signal, rewrites the flag to true.

As described in detail later, when the sensor controller 31 correctly receives the response signal transmitted from the active pen 2C, the sensor controller 31 acquires the number, the shape, and the arrangement of electrodes included in the active pen 2C from the functional information included in the response signal. Furthermore, based on the acquired information, the sensor controller 31 allocates one or more time slots to each electrode and determines the type of signal (downlink signal DS or reverse-phase signal of downlink signal DS) to be transmitted from the active pen 2C from each electrode. The command COM in the beacon signal BS includes setting information indicating results of the allocation and the determination.

When the control unit 44 receives the command COM after storing the flag in the memory, the control unit 44 acquires, for each electrode, the transmission timing of the downlink signal DS or the reverse-phase signal of the downlink signal DS from the setting information included in the command COM. Furthermore, the control unit 44 transmits the in-slot signal or a reverse-phase signal of the in-slot signal from at least one of the pen tip electrode 21 and the peripheral electrodes 22b and 22c according to the acquired transmission timing. Specifically, to transmit the in-slot signal from an electrode, the control unit 44 causes the transmission unit 45 to output the in-slot signal and uses the control signals SWC1 to SWC3 to connect the electrode to the normal-phase signal output terminal of the reverse-phase signal generation unit 46. To transmit the reverse-phase signal of the in-slot signal from an electrode, the control unit 44 causes the transmission unit 45 to output the in-slot signal and uses the control signals SWC1 to SWC3 to connect the electrode to the reverse-phase signal output terminal of the reverse-phase signal generation unit 46.

Figure 3:
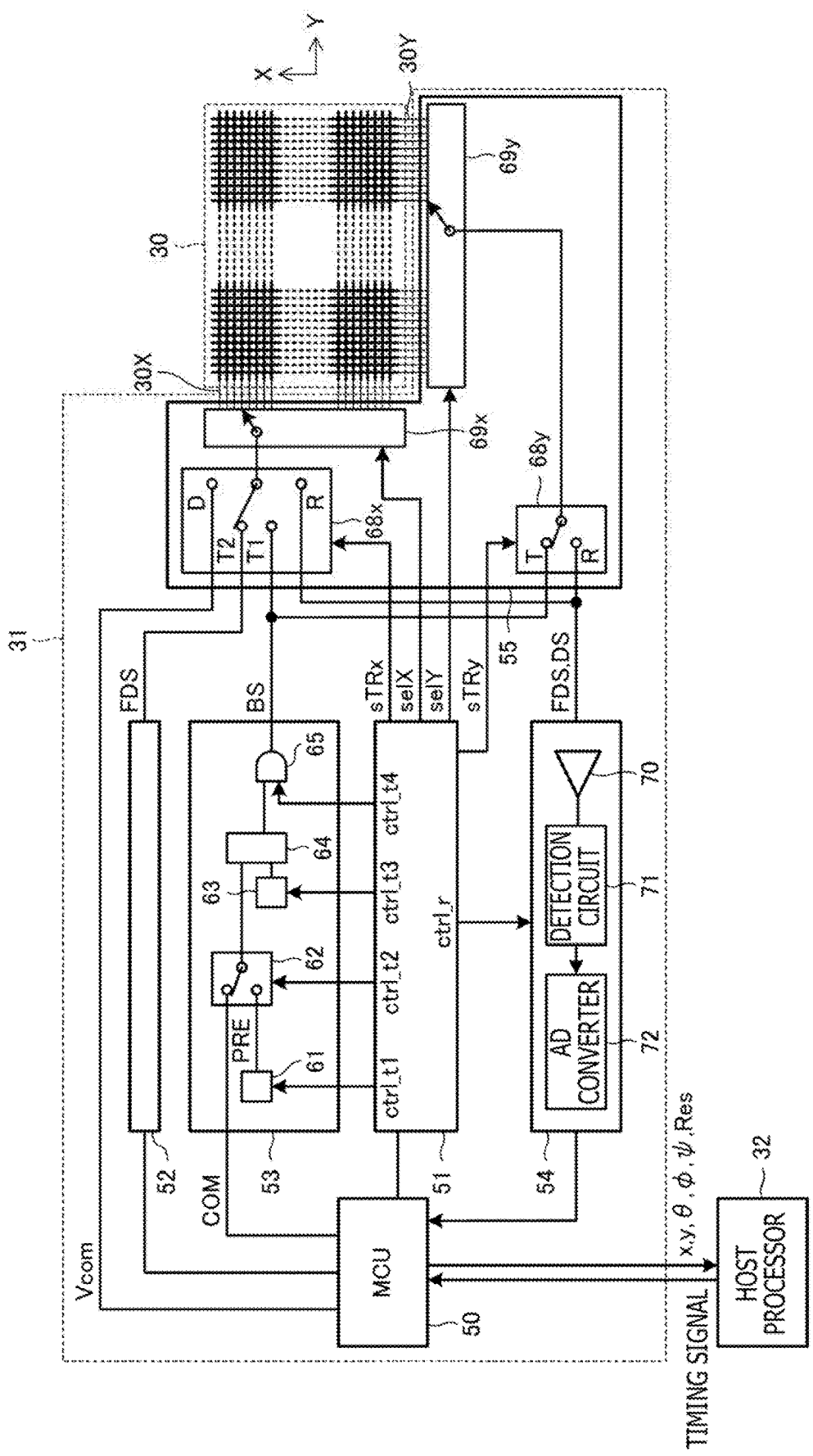
FIG. 3 is a diagram illustrating internal configurations of a sensor electrode group 30 and a sensor controller 31.

FIG. 3 is a diagram illustrating internal configurations of the sensor electrode group 30 and the sensor controller 31.

The sensor electrode group 30 provides a mutual-capacitance touch sensor and includes the plurality of sensor electrodes 30X and the plurality of sensor electrodes 30Y arranged in a matrix, in which the plurality of sensor electrodes 30X are transparent conductors extending in a Y-direction and arranged at equal intervals in an X-direction orthogonal to the Y-direction, and the plurality of sensor electrodes 30Y are transparent conductors extending in the X-direction and arranged at equal intervals in the Y-direction. Although the sensor electrodes 30X and 30Y include linear conductors in the example illustrated, conductors in other shapes can be included in the sensor electrode group 30. For example, a plurality of two-dimensionally arranged rectangular conductors may be included in the sensor electrode group 30. In addition, the sensor electrode group 30 may provide a self-capacitance touch sensor instead of the mutual-capacitance touch sensor.

One of the sensor electrodes 30X and 30Y may also be used as common electrodes in the display apparatus. The type of tablet terminal 3 in which one of the sensor electrodes 30X and 30Y is used as common electrodes in the display apparatus is called, for example, an "in-cell type." On the other hand, the type of tablet terminal 3 in which the sensor electrodes 30X and 30Y are provided separately from the common electrodes in the display apparatus is called, for example, an "out-cell type" or an "on-cell type." Although the description will be continued assuming that the tablet terminal 3 is the in-cell type, the present disclosure can be similarly applied to the out-cell type or on-cell type tablet terminal. In addition, although the description will be continued assuming that the sensor electrodes 30X are used as the common electrodes, the sensor electrodes 30Y may be used as the common electrodes.

The display apparatus needs to maintain the potential of the common electrodes at a predetermined common potential Vcom to execute the driving process of pixels. Therefore, in the in-cell type tablet terminal 3, the sensor controller 31 cannot communicate with the active pens 2A to 2C or detect the finger while the display apparatus is executing the driving process of pixels. Therefore, the host processor 32 uses a horizontal blanking interval and a vertical blanking interval, in which the driving process of pixels is not executed, to command the sensor controller 31 to communicate with the active pen 2 and to detect the finger. Specifically, the host processor 32 sets the display period corresponding to one screen as one frame and regards the horizontal blanking interval and the vertical blanking interval included in the frame as time slots in which to control the sensor controller 31 to communicate with the active pen 2 and to detect the finger.

The sensor controller 31 includes a memory control unit (MCU) 50, a logic unit 51, transmission units 52 and 53, a reception unit 54, and a selection unit 55 as illustrated in FIG. 3.

The MCU 50 and the logic unit 51 are control units that control the transmission units 52 and 53, the reception unit 54, and the selection unit 55 to control transmission and reception operations of the sensor controller 31. Specifically, the MCU 50 includes a ROM and a RAM inside, and is a microprocessor that operates by executing programs stored in the ROM and the RAM. The MCU 50 also has a function of outputting the common potential Vcom and the command COM. On the other hand, the logic unit 51 is configured to output control signals ctrl_t1 to ctrl_t4, ctrl_r, sTRx, sTRy, selX, and selY based on the control of the MCU 50.

The order based on the command COM output by the MCU 50 includes the setting information, which indicates the allocation of one or more time slots to each electrode included in each of the detected active pens 2 and which indicates the type of signal (downlink signal DS or reverse-phase signal of downlink signal DS) to be transmitted from the active pen 2 from each electrode in the allocated time slots. Based on the functional information received from each of the detected active pens 2, the MCU 50 is configured to select one of multiple sets of predefined setting information to be described later for each of the active pens 2 and to arrange, in the command COM, one or more indices respectively indicating one or more sets of selected setting information.

The order based on the command COM may also include transmission of pen pressure data indicating the pressure applied to the pen tip of the active pen 2, or transmission of data indicating the pressed state of a switch (not illustrated) provided on the surface of the active pen 2, or transmission of a stylus identification (ID) stored in advance in the active pen 2, or the like. In this case, the active pen 2 receiving the order may include the requested data in the data signal of the response signal to be transmitted to the sensor controller or may use short-range wireless communication, such as Bluetooth (registered trademark), to transmit the requested data to the sensor controller. As another example, the in-slot signal to be transmitted from the pen tip electrode 21 may be prepared as a signal modulated with the requested data.

The transmission unit 52 is a circuit that generates a finger detection signal FDS used to detect the finger according to the control of the MCU 50. The finger detection signal FDS may be, for example, a non-modulated pulse sequence signal or a sinusoidal signal.

The transmission unit 53 is a circuit that generates the beacon signal BS according to the control of the MCU 50 and the logic unit 51, and the transmission unit 53 includes a preamble supply unit 61, a switch 62, a code sequence holding unit 63, a spread processor 64, and a transmission guard unit 65 as illustrated in FIG. 3. The preamble supply unit 61 may be included in the MCU 50.

The preamble supply unit 61 holds the preamble PRE and has a function of outputting the preamble PRE according to an instruction of the control signal ctrl_t1 supplied from the logic unit 51. The preamble PRE output by the preamble supply unit 61 is supplied to the switch 62. The command COM is also supplied from the MCU 50 to the switch 62.

The switch 62 has a function of selecting either one of the preamble supply unit 61 and the MCU 50 according to the control signal ctrl_t2 supplied from the logic unit 51 and supplying the output of the selected one to the spread processor 64. When the switch 62 selects the preamble supply unit 61, two symbols P included in the preamble PRE are sequentially supplied to the spread processor 64. On the other hand, when the switch 62 selects the MCU 50, four symbols D included in the command COM are sequentially supplied to the spread processor 64.

The code sequence holding unit 63 has a function of generating and holding a spreading code with autocorrelation properties, with a length of, for example, 11 chips, based on the control signal ctrl_t3 supplied from the logic unit 51. The spreading code held by the code sequence holding unit 63 is supplied to the spread processor 64.

The spread processor 64 has a function of modulating the spreading code held by the code sequence holding unit 63 based on the values of the symbols supplied through the switch 62. The modulation is performed by, for example, a cyclic shift, and in that case, a spreading code with a length of 12 chips is output for each symbol as a result of the modulation.

The spreading codes output from the spread processor 64 are sequentially supplied to the transmission guard unit 65. The transmission guard unit 65 plays a role of inserting a guard period, which is a period in which both of the transmission and the reception are not performed, between a transmission period of the beacon signal BS and a reception period of a reception operation performed by the reception unit 54 to be described later based on the control signal ctrl_t4 supplied from the logic unit 51.

The reception unit 54 is a circuit for receiving the downlink signal DS transmitted from the active pen 2 or the finger detection signal FDS transmitted from the transmission unit 52 based on the control signal ctrl_r of the logic unit 51. Specifically, the reception unit 54 includes an amplifier circuit 70, a detection circuit 71, and an analog-digital (AD) converter 72.

The amplifier circuit 70 amplifies and outputs the signal supplied from the selection unit 55. The detection circuit 71 is a circuit that generates a voltage corresponding to the level of the output signal of the amplifier circuit 70. The AD converter 72 is a circuit that samples, at predetermined time intervals, the voltage output from the detection circuit 71 to thereby generate a digital signal. The digital signal output by the AD converter 72 is supplied to the MCU 50. Based on the digital signal supplied in this way, the MCU 50 detects the position (x, y) of the active pen 2 or the finger, the inclination θ and the azimuth φ of the active pens 2B and 2C, and the rotation angle ψ of the active pen 2C and acquires data Res transmitted from the active pen 2. The MCU 50 successively outputs the detected position (x, y), inclination θ, azimuth φ, and rotation angle ψ and the acquired data Res to the host processor 32.

The selection unit 55 includes switches 68x and 68y and conductor selection circuits 69x and 69y.

The switch 68y is a switching element in which a common terminal and either one of a T terminal and an R terminal are connected. The common terminal of the switch 68y is connected to the conductor selection circuit 69y. The T terminal is connected to an output terminal of the transmission unit 53, and the R terminal is connected to an input terminal of the reception unit 54. The switch 68x is a switching element in which a common terminal and any one of a T1 terminal, a T2 terminal, a D terminal, and an R terminal are connected. The common terminal of the switch 68x is connected to the conductor selection circuit 69x. The T1 terminal is connected to the output terminal of the transmission unit 53. The T2 terminal is connected to an output terminal of the transmission unit 52. The D terminal is connected to an output terminal of the MCU 50 that outputs the common potential Vcom. The R terminal is connected to the input terminal of the reception unit 54.

The conductor selection circuit 69x is a switching element for selectively connecting the plurality of sensor electrodes 30X to the common terminal of the switch 68x. The conductor selection circuit 69x can also connect part or all of the plurality of sensor electrodes 30X to the common terminal of the switch 68x at the same time.

The conductor selection circuit 69y is a switching element for selectively connecting the plurality of sensor electrodes 30Y to the common terminal of the switch 68y. The conductor selection circuit 69y can also connect part or all of the plurality of sensor electrodes 30Y to the common terminal of the switch 68y at the same time.

Four control signals sTRx, sTRy, selX, and selY are supplied from the logic unit 51 to the selection unit 55. Specifically, the control signal sTRx is supplied to the switch 68x. The control signal sTRy is supplied to the switch 68y. The control signal selX is supplied to the conductor selection circuit 69x. The control signal selY is supplied to the conductor selection circuit 69y. The logic unit 51 uses the control signals sTRx, sTRy, selX, and selY to control the selection unit 55 to perform the transmission of the beacon signal BS or the finger detection signal FDS, the application of the common potential Vcom, and the reception of the downlink signal DS or the finger detection signal FDS.

Hereinafter, the control of the selection unit 55 controlled by the logic unit 51 and the operation of the MCU 50 in response to the control will be described in detail for each of the detection of the finger, the execution of the pixel driving operation, the transmission of the beacon signal BS, the reception of the response signal, and the reception of the in-slot signal.

First, the logic unit 51 in detecting the finger controls the switch 68x to connect the T2 terminal to the common terminal and controls the switch 68y to connect the R terminal to the common terminal. The logic unit 51 controls the conductor selection circuits 69x and 69y to sequentially select the combinations of the plurality of sensor electrodes 30X and 30Y. In this way, the finger detection signals FDS passing through a plurality of intersections of the plurality of sensor electrodes 30X and 30Y are sequentially received by the reception unit 54. The MCU 50 detects the position of the finger on the panel surface 3a based on the reception intensity of the finger detection signals FDS sequentially received in this way.

Next, the logic unit 51 in executing the pixel driving operation controls the switch 68x to connect the D terminal to the common terminal and controls the conductor selection circuit 69x to connect all of the plurality of sensor electrodes 30X to the switch 68x at the same time. As a result, the common potential Vcom is supplied from the MCU 50 to each sensor electrode 30X, and the display apparatus can execute the pixel driving operation. Note that the MCU 50 causes the logic unit 51 to execute the control at timing based on a timing signal supplied from the host processor 32.

Next, the logic unit 51 in transmitting the beacon signal BS controls the switch 68x to connect the R terminal to the common terminal and controls the switch 68y to connect the T terminal to the common terminal. As a result, the beacon signal BS output from the transmission unit 53 is supplied to the conductor selection circuit 69y. The logic unit 51 further controls the conductor selection circuit 69y to connect all of the plurality of sensor electrodes 30Y to the switch 68y at the same time. As a result, the beacon signals BS are transmitted from all of the sensor electrodes 30Y at the same time, and the active pen 2 can receive the beacon signal BS anywhere in the panel surface 3a.

Next, the logic unit 51 in receiving the response signal controls each of the switches 68x and 68y to connect the R terminal to the common terminal. The logic unit 51 first executes a process of using the control signals selX and selY to control the conductor selection circuits 69x and 69y to sequentially select the plurality of sensor electrodes 30X and 30Y one by one while the burst signal in the response signal is transmitted. As a result, the plurality of sensor electrodes 30X and 30Y are sequentially connected to the input terminal of the reception unit 54 one by one, and the reception intensity of the burst signal in each of the sensor electrodes 30X and 30Y is sequentially supplied from the reception unit 54 to the MCU 50. The MCU 50 determines the position of the active pens 2 that has transmitted the response signal, based on the series of reception intensity supplied in this way. Next, the logic unit 51 controls the conductor selection circuits 69x and 69y to select only a predetermined number (for example, one) of the plurality of sensor electrodes 30X and 30Y near the detected position. The response signals received by the selected predetermined number of sensor electrodes are supplied to the MCU 50 through the reception unit 54. As a result, the data signal transmitted after the burst signal is supplied to the MCU 50. The MCU 50 demodulates and decodes the data signal supplied in this way to acquire the data Res.

Lastly, the logic unit 51 in receiving the in-slot signal controls each of the switches 68x and 68y to connect the R terminal to the common terminal and then executes a process of using the control signals selX and selY to control the conductor selection circuits 69x and 69y. Specifically, the control of the control selection circuits 69x and 69y is performed to sequentially select a predetermined number (for example, five) of the plurality of sensor electrodes 30X positioned near the latest position detected for the corresponding active pen 2, and a predetermined number (for example, five) of the plurality of sensor electrodes 30Y positioned near the latest position detected for the corresponding active pen 2. As a result, the selected sensor electrodes 30X and 30Y are sequentially connected to the input terminal of the reception unit 54 one by one, and the reception intensity of the in-slot signal in each of the sensor electrodes 30X and 30Y is sequentially supplied from the reception unit 54 to the MCU 50. Based on the series of reception intensity supplied in this way, the MCU 50 updates the position (x, y) of the active pen 2 that has transmitted the in-slot signal, detects the inclination θ and the azimuth φ, and detects the rotation angle ψ.

The overall summary of the position detection system 1 has been described above. Next, some characteristic features of the present disclosure in the configuration of the position detection system 1 will be described in detail. Hereinafter, the detection of the position (x, y), the inclination θ, the azimuth φ, and the rotation angle ψ of the active pens 2 executed based on the in-slot signal will be described in detail first, and in the description, a configuration that allows the sensor controller 31 to correctly detect the instruction position of the active pen 2 tilted with respect to the panel surface 3a in the detection will be described. Next, the reason that the sensor controller 31 falsely detects the contact position of the hand as the instruction position of the active pen 2 will be described, and then the configuration for preventing the false detection will be described. Lastly, a communication method that allocates time slots in a timely manner according to the functions of each active pen 2 and that is executed between the active pen 2 and the sensor controller 31 will be described.

First, the detection of the position (x, y), the inclination θ, the azimuth φ, and the rotation angle ψ of the active pen 2 based on the in-slot signal will be described in detail with reference to FIGS. 4 to 12. In the following description, the configuration that allows the sensor controller 31 to correctly detect the instruction position of the active pens 2 tilted with respect to the panel surface 3a will also be described.

Figures 4, 5:
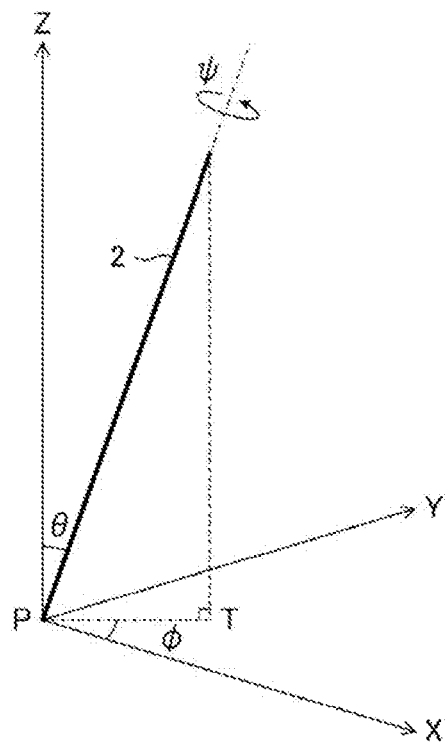
FIG. 4 is an explanatory view of an inclination θ, an azimuth φ, and a rotation angle ψ of an active pen 2.
FIG. 5 is a diagram illustrating signals the active pen 2 transmits in a time slot, which is ordered by the sensor controller 31, in a case of detecting a position (x, y), in a case of detecting the inclination θ and the azimuth φ, and in a case of detecting the rotation angle ψ.

FIG. 4 is an explanatory view of the inclination θ, the azimuth φ, and the rotation angle ψ of the active pen 2. In FIG. 4 and FIGS. 6 to 8 to be described later, the X-axis and the Y-axis indicate directions on the panel surface 3a, and the Z-axis indicates a direction normal to the panel surface 3a. The thick line represents the pen axis of the active pen 2, and a position P indicates the contact position of the pen tip of the active pen 2 and the panel surface 3a.

As illustrated in FIG. 4, the inclination θ of the active pen 2 is expressed by an angle formed by the Z-axis and the pen axis of the active pen 2. Assuming that T represents a position of intersection between a perpendicular line, which is drawn from one point on the pen axis to the XY plane, and the XY plane, the azimuth φ of the active pens 2 is expressed by an angle formed by a line segment, which connects the position P and the position T, and the X-axis. The rotation angle ψ denotes a rotation angle of the active pen 2 about the pen axis.

FIG. 5 is a diagram illustrating in-slot signals to be transmitted from the active pen 2, the transmission of which is ordered by the sensor controller 31, in each of the case of detecting the position (x, y), the case of detecting the inclination θ and the azimuth φ, and the case of detecting the rotation angle ψ. In FIG. 5, "+" denotes transmission of a normal-phase signal of the in-slot signal (burst signal) output from the transmission unit 45 illustrated in FIG. 2, and "−" denotes transmission of a reverse-phase signal of the in-slot signal (burst signal) output from the transmission unit 45 illustrated in FIG. 2.

First, focusing on the active pen 2A, as illustrated in FIG. 5, the active pens 2A supports only the detection of the position (x, y) and does not support the detection of the inclination θ, the azimuth φ, and the rotation angle ω. In detecting the position (x, y) of the active pen 2A, the sensor controller 31 causes the active pens 2A to transmit the normal-phase signal of the in-slot signal from the pen tip electrode 21.

FIG. 9 is a diagram illustrating a reception intensity distribution on the panel surface 3a when the active pen 2A transmits the burst signal from the pen tip electrode 21. In FIG. 9 and FIGS. 10 to 12 to be described later, a coordinate 0 represents the contact position of the pen tip electrode 21 and the panel surface 3a. Furthermore, in FIG. 9 and FIGS. 10 and 11 to be described later, a broken-line graph indicates a case in which the angle formed by the panel surface 3a and the pen axis is 0 degrees (a case in which active pen 2A is upright with respect to panel surface 3a), and a solid-line graph indicates a case in which the angle formed by the panel surface 3a and the pen axis is 45 degrees (a case in which active pen 2A is tilted with respect to panel surface 3a).

As indicated by the broken-line graph of FIG. 9, the reception intensity distribution of the case in which active pen 2A is upright with respect to the panel surface 3a is a substantially normal distribution with the peak at the contact position (coordinate 0) of the pen tip electrode 21 and the panel surface 3a. The sensor controller 31 uses this property of the reception intensity distribution to calculate the position (x, y) of the active pen 2A. Specifically, the sensor controller 31 uses the normal distribution curve to approximate the reception intensity in each of the predetermined number of sensor electrodes 30X and obtains the peak position to thereby calculate the x-coordinate at the position of the active pen 2A. In addition, the sensor controller 31 uses the normal distribution curve to approximate the reception intensity in each of the predetermined number of sensor electrodes 30Y and obtains the peak position to thereby calculate the y-coordinate at the position of the active pen 2A.

On the other hand, as indicated by the solid-line graph of FIG. 9, the peak of the reception intensity distribution of the case in which the active pen 2A is tilted with respect to the panel surface 3a is moved toward the tilt of the active pen 2A compared to the case where the active pen 2A is upright. As a result, the position (x, y) of the active pens 2A calculated as described above is also shifted toward the tilt of the active pen 2A as viewed from the original contact position. As the positional shift cannot be avoided in the active pen 2A, the peripheral electrodes 22a to 22c can be used to reduce the positional shift in the active pens 2B and 2C.

Next, focusing on the active pen 2B, the active pen 2B supports the detection of the position (x, y), the inclination θ, and the azimuth φ and does not support the detection of the rotation angle ψ as illustrated in FIG. 5. In detecting the position (x, y) of the active pen 2B, the sensor controller 31 causes the active pen 2B to transmit the normal-phase signal of the in-slot signal from the pen tip electrode 21 and causes the active pen 2B to transmit the reverse-phase signal of the in-slot signal from the peripheral electrode 22a at the same time. In detecting the inclination θ and the azimuth φ of the active pen 2B, the sensor controller 31 causes the active pen 2B to transmit the normal-phase signals of the in-slot signals from the pen tip electrode 21 and the peripheral electrode 22a at the same time.

FIG. 10 is a diagram illustrating a reception intensity distribution on the panel surface 3a when the active pen 2B transmits the burst signal from the pen tip electrode 21 and transmits the reverse-phase signal of the burst signal from the peripheral electrode 22a at the same time. The specific method of calculating the position (x, y) of the active pen 2B performed by the sensor controller 31 based on the reception intensity illustrated in FIG. 10 is similar to the case of the active pen 2A.

As can be understood by comparing FIG. 10 and FIG. 9, the positional shift of the peak in the solid-line graph is smaller in the example of FIG. 10 than in the example of FIG. 9. This is because the transmission of the burst signal from the pen tip electrode 21 and the transmission of the reverse-phase signal of the burst signal from the peripheral electrode 22a at the same time selectively reduce the intensity of the downlink signal DS in the direction of the tilt of the active pen 2B. Therefore, even when the active pen 2B is tilted with respect to the panel surface 3a, the sensor controller 31 can correctly detect the instruction position compared to the case of the active pens 2A.

As illustrated in FIG. 5, the signal need not be transmitted from the peripheral electrode 22a in detecting the position (x, y) of the active pen 2B. Even in this way, the position (x, y) of the active pen 2B can be detected with accuracy at least equivalent to the accuracy of the active pen 2A.

FIG. 11 is a diagram illustrating a reception intensity distribution on the panel surface 3a when the active pen 2B transmits the burst signal from each of the pen tip electrode 21 and the peripheral electrode 22a. As can be understood by comparing FIG. 11 and FIG. 10, the positional shift of the peak of the reception intensity distribution in the case where the active pen 2B is tilted with respect to the panel surface 3a is larger in the example of FIG. 11 than in the case of FIG. 10. This is because the tilt of the active pen 2B significantly changes the position of the peripheral electrode 22a. The sensor controller 31 uses this property of the reception intensity distribution to calculate the inclination θ and the azimuth φ of the active pen 2B.

Figure 6:
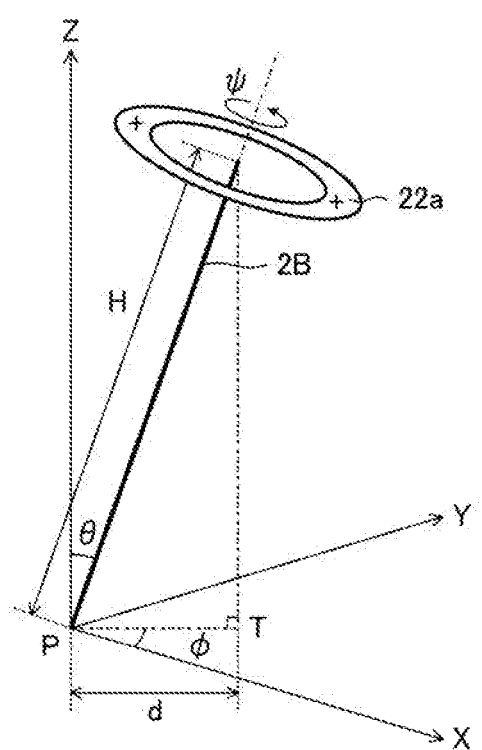
FIG. 6 is a diagram illustrating a principle of calculating the inclination θ and the azimuth φ of the active pen 2B.

FIG. 6 is a diagram illustrating a principle of calculating the inclination θ and the azimuth φ of the active pen 2B. The position T illustrated in FIG. 6 indicates the position of the active pen 2B detected when the active pen 2B transmits the in-slot signals from the pen tip electrode 21 and the peripheral electrode 22a at the same time.

Figure 8A:
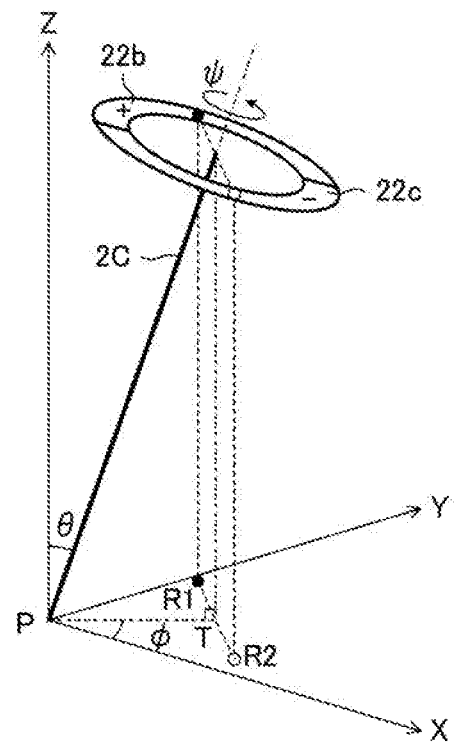
FIGS. 8A and 8B are diagrams illustrating a principle of calculating the rotation angle ψ of the active pen 2C.
Figure 8B:
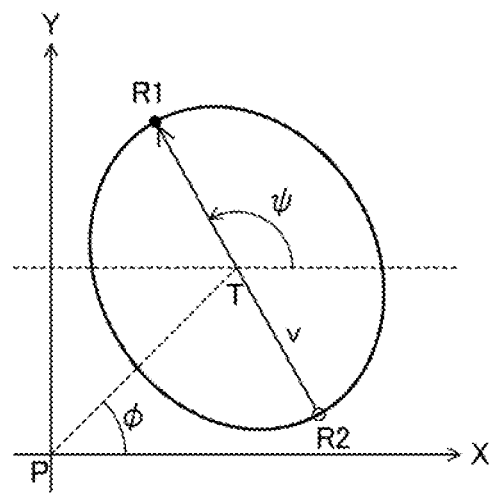

When the angle formed by the active pen 2B and the Z-axis is θ (>0), as illustrated in FIG. 8A, the position P and the position T are separated. In this case, a distance d between the position P and the position T satisfies a relationship of d=H·cos θ. Here, H represents the distance from the pen tip of the active pen 2 to the peripheral electrode 22a. Therefore, the sensor controller 31 first calculates the distance d and applies the result of the calculation to the equation to calculate the angle θ. In addition, the sensor controller 31 obtains an angle formed by a vector from the position P toward the position T and the X-axis to calculate the azimuth φ. In this way, the sensor controller 31 is configured to use the position P and the position T to calculate the inclination θ and the azimuth φ of the active pen 2B.

As illustrated in FIG. 5, the signal need not be transmitted from the pen tip electrode 21 in detecting the inclination θ and the azimuth φ of the active pen 2B. In this way, the distance d can be a larger value, and the angle θ can be calculated with higher accuracy.

Next, focusing on the active pen 2C, the active pen 2C supports the detection of all of the position (x, y), the inclination θ, the azimuth φ, and the rotation angle ψ as illustrated in FIG. 5. The signals transmitted from the electrodes in detecting the position (x, y) of the active pen 2C and in detecting the inclination θ and the azimuth φ of the active pen 2C are similar to the case of the active pen 2B. Here, it is assumed that the signals transmitted from the peripheral electrodes 22b and 22c are the same as the signals transmitted from the peripheral electrode 22a of the active pen 2B.

The signal transmission in detecting the rotation angle ψ of the active pen 2C is executed in two steps R1 and R2. In step R1, the sensor controller 31 causes the active pen 2C to transmit the in-slot signals from the pen tip electrode 21 and the peripheral electrode 22b at the same time, and at the same time, transmit the reverse-phase signal of the in-slot signal from the peripheral electrode 22c. Next, in step R2, the sensor controller 31 causes the active pen 2C to transmit the in-slot signals from the pen tip electrode 21 and the peripheral electrode 22c at the same time, and at the same time, transmit the reverse-phase signal of the in-slot signal from the peripheral electrode 22b.

The reception intensity distribution on the panel surface 3a in detecting the position (x, y) is similar to the reception intensity distribution in FIG. 10. The sensor controller 31 calculates the position (x, y) of the active pen 2C as in the case of the active pen 2B. As a result, even when the active pen 2C is tilted with respect to the panel surface 3a, the sensor controller 31 can correctly detect the instruction position of the active pen 2C compared to the case of the active pen 2A.

In addition, the reception intensity distribution on the panel surface 3a in detecting the inclination θ and the azimuth φ is similar to the reception intensity distribution in FIG. 11. The sensor controller 31 calculates the inclination θ and the azimuth φ as in the case of the active pen 2B.

FIG. 12A is a diagram illustrating the reception intensity distribution on the panel surface 3a in step R1 illustrated in FIG. 5. FIG. 12B is a diagram illustrating the reception intensity distribution on the panel surface 3a in step R2 illustrated in FIG. 5. In FIGS. 12A and 12B, the inclination θ of the active pen 2C is 0 degrees. The broken-line graph is copied from FIG. 10 illustrating the case of 0 degrees, for comparison.

As illustrated in FIGS. 12A and 12B, there is a bias in the reception intensity distribution observed in each of steps R1 and R2. Specifically, the reception intensity on the side of one of the peripheral electrodes 22b and 22c that transmits the normal-phase signal of the burst signal is larger than the reception intensity on the side of the other of the peripheral electrodes 22b and 22c that transmits the reverse-phase signal of the burst signal. The sensor controller 31 uses this property of the reception intensity distribution to calculate the rotation angle ψ of the active pen 2C.

Figure 7A:
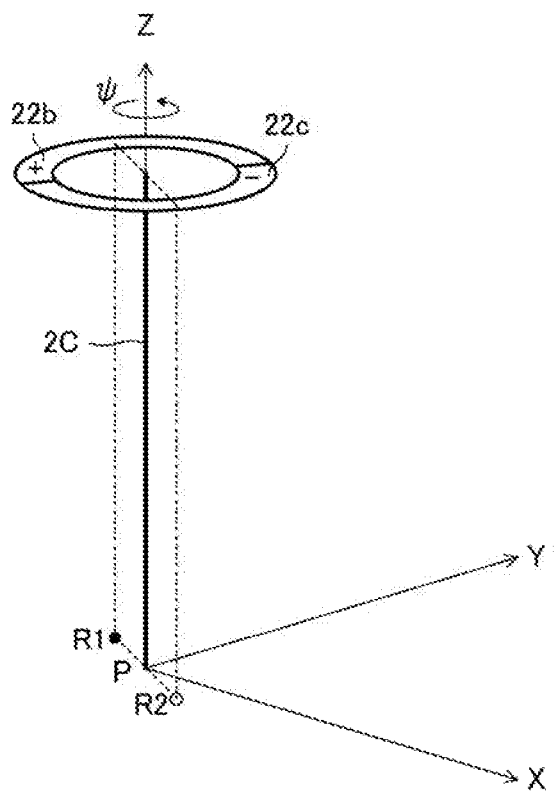
FIGS. 7A and 7B are diagrams illustrating a principle of calculating the rotation angle ψ of the active pen 2C.
Figure 7B:
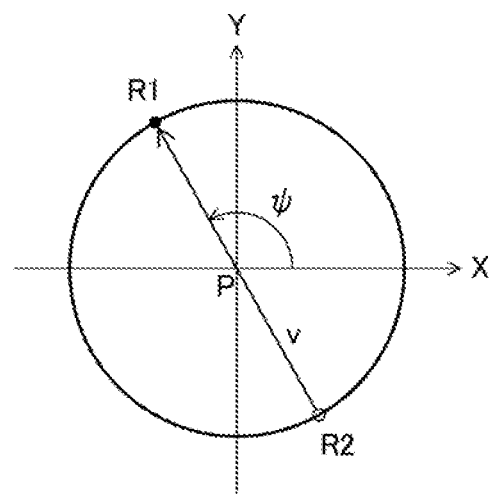

FIG. 7 and FIG. 8 illustrate a principle of calculating the rotation angle ψ of the active pen 2C. FIG. 7 illustrates a case in which the inclination θ is 0, and FIG. 8 illustrates a case in which the inclination θ is not 0. Positions R1 and R2 illustrated in FIGS. 7 and 8 indicate positions detected in steps R1 and R2 illustrated in FIG. 5, respectively. As illustrated in FIGS. 12A and 12B, although the actual position of the peak of the reception intensity distribution is about the same in step R1 and step R2, the position of the peak obtained by approximation using the normal distribution curve significantly varies between step R1 and step R2 due to the bias. Therefore, as illustrated in FIGS. 7 and 8, the position R1 detected in step R1 and the position R2 detected in step R2 are significantly different. As illustrated in FIGS. 7 and 8, the position R1 and the position R2 are at positions symmetric about the position P when the inclination θ is 0 and are at positions symmetric about the position T when the inclination θ is not 0.

The position R1 is a position detected when the peripheral electrode 22b transmits the normal-phase signal of the burst signal, and therefore, the position R1 corresponds to the side provided with the peripheral electrode 22b in the periphery of the active pen 2C. Similarly, the position R2 is a position detected when the peripheral electrode 22c transmits the normal-phase signal of the burst signal, and therefore, the position R2 corresponds to the side provided with the peripheral electrode 22c in the periphery of the active pen 2C. Therefore, an angle formed by a vector v (vector from position R2 toward position R1) and the X-axis illustrated in FIG. 7B and FIG. 8B corresponds to the rotation angle ψ of the active pen 2C. Therefore, the sensor controller 31 obtains the angle formed by the vector v and the X-axis to calculate the rotation angle ψ. In this way, the sensor controller 31 is configured to use the position R1 and the position R2 to calculate the rotation angle ψ of the active pen 2C.

Note that as illustrated in FIG. 5, the signal need not be transmitted from the pen tip electrode 21 in detecting the rotation angle ψ of the active pen 2C. Furthermore, transmission of the reverse-phase signal may be replaced with no signal transmission. Even in this way, the position R1 and the position R2 can be used to calculate the rotation angle ψ of the active pen 2C as described above.

As described above, according to the active pens 2B and 2C of the present embodiment, the intensity of the downlink signal DS in the direction of the tilt of the active pens 2B and 2C can be selectively reduced. Therefore, the sensor controller 31 can correctly detect the instruction positions of the active pens 2B and 2C tilted with respect to the panel surface 3a.

Furthermore, according to the active pens 2B and 2C of the present embodiment, the inclination θ and the azimuth φ can be calculated in addition to the instruction position. According to the active pen 2C of the present embodiment, the rotation angle ψ can be further calculated.

Next, the reason that the sensor controller 31 falsely detects the contact position of the hand as the instruction position of the active pen 2 will be described, and then the configuration for preventing the false detection will be described.

Figure 13A:
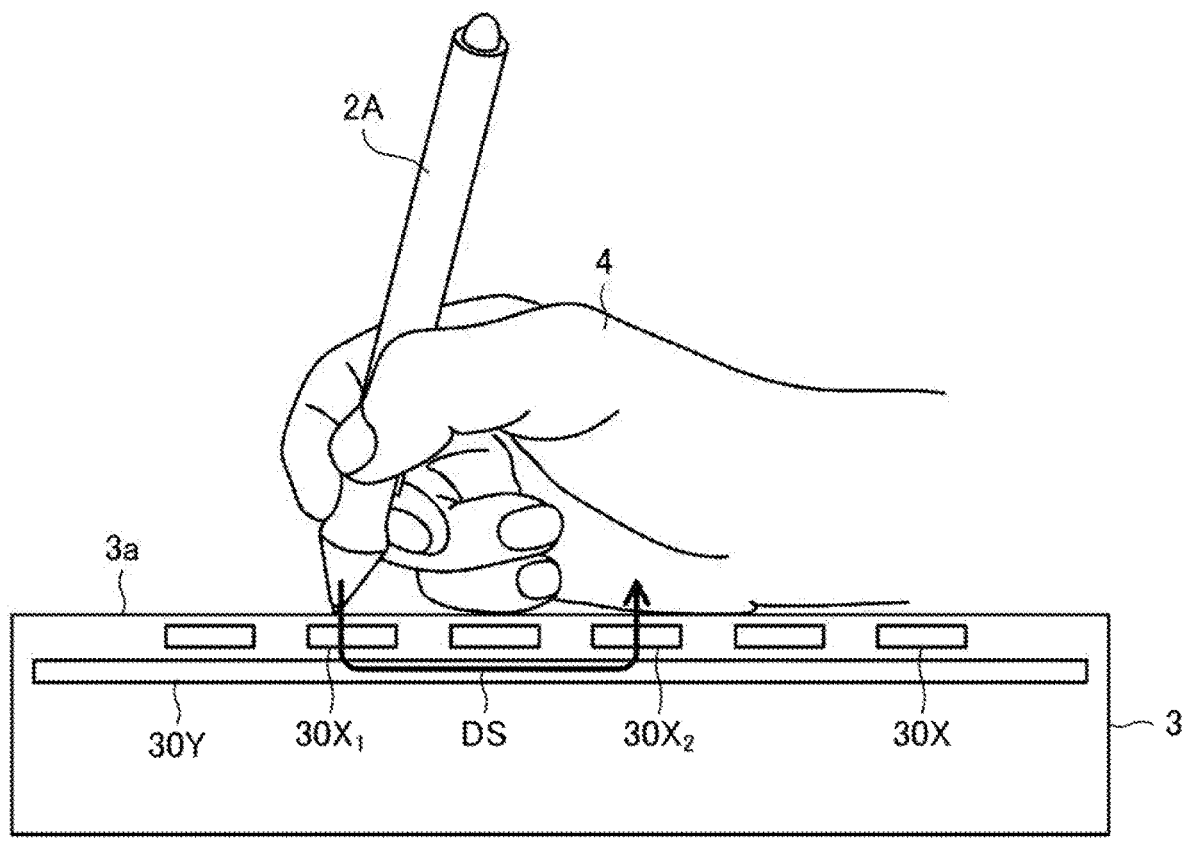
FIG. 13A is a diagram illustrating a state in which a user uses the active pen 2A to write on the panel surface 3a of a tablet terminal 3.
Figure 13B:
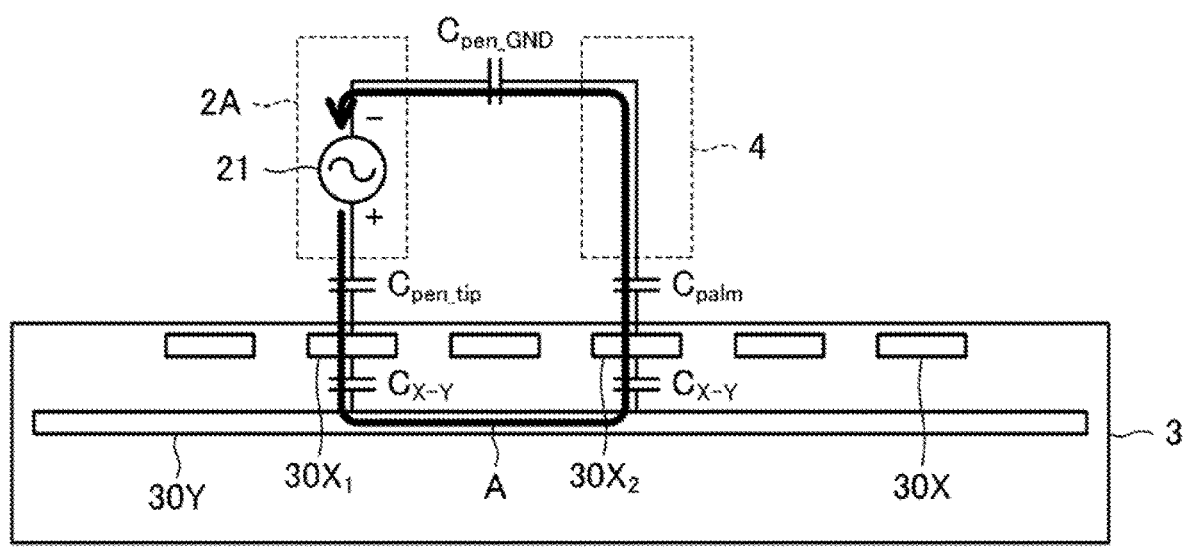
FIG. 13B is a diagram illustrating an equivalent circuit of FIG. 13A.

FIG. 13A is a diagram illustrating a state in which the user uses the active pen 2A to write on the panel surface 3a of the tablet terminal 3. FIG. 13B is a diagram illustrating an equivalent circuit of FIG. 13A. The pictures of the tablet terminal 3 illustrated in FIGS. 13A and 13B are cross-sectional views schematically illustrating a cross section cut in the X-direction.

A sensor electrode $30X_1$ illustrated in FIG. 13A represents the sensor electrode 30X closest to the pen tip electrode 21. A sensor electrode $30X_2$ illustrated in FIG. 13A represents the sensor electrode 30X closest to the hand of the user holding the active pen 2A. In the example of FIG. 13A, the hand of the user holding the active pen 2 is touching the panel surface 3a near the sensor electrode $30X_2$.

Capacitance $C_{pen\_tip}$ illustrated in FIG. 13B is coupling capacitance formed between the pen tip electrode 21 of the active pen 2A and the sensor electrode $30X_1$. Capacitance $C_{pen\_GND}$ is coupling capacitance formed between a housing (ground terminal) of the active pen 2A and the hand of the user, and capacitance $C_{palm}$ is coupling capacitance formed between the hand of the user touching the panel surface 3a and the sensor electrode $30X_2$. Furthermore, capacitance $C_{X\_Y}$ is coupling capacitance formed between each sensor electrode 30X and a sensor electrode 30Y.

As illustrated in FIG. 13B, when the hand of the user is touching the panel surface 3a, a current path A is formed from the pen tip electrode 21 through the sensor electrode $30X_1$ to the sensor electrode 30Y, and further from the sensor electrode 30Y through the sensor electrode $30X_2$ and a human body 4 to the ground terminal of the active pen 2A. As a result, a portion of the downlink signal DS sent out from the pen tip electrode 21 of the active pen 2A flows through the current path A, and at that time, a current is induced in the sensor electrode $30X_2$. Once the current is induced in the sensor electrode $30X_2$ in this way, the sensor controller 31 also detects the pen tip electrode 21 of the active pen 2A near the sensor electrode $30X_2$. This is the reason that the sensor controller 31 falsely detects the contact position of the hand as the instruction position of the active pen 2.

The active pens 2B and 2C according to the present embodiment can be used to prevent such a false detection. This will be described in detail with reference to FIG. 14.

Figure 14:
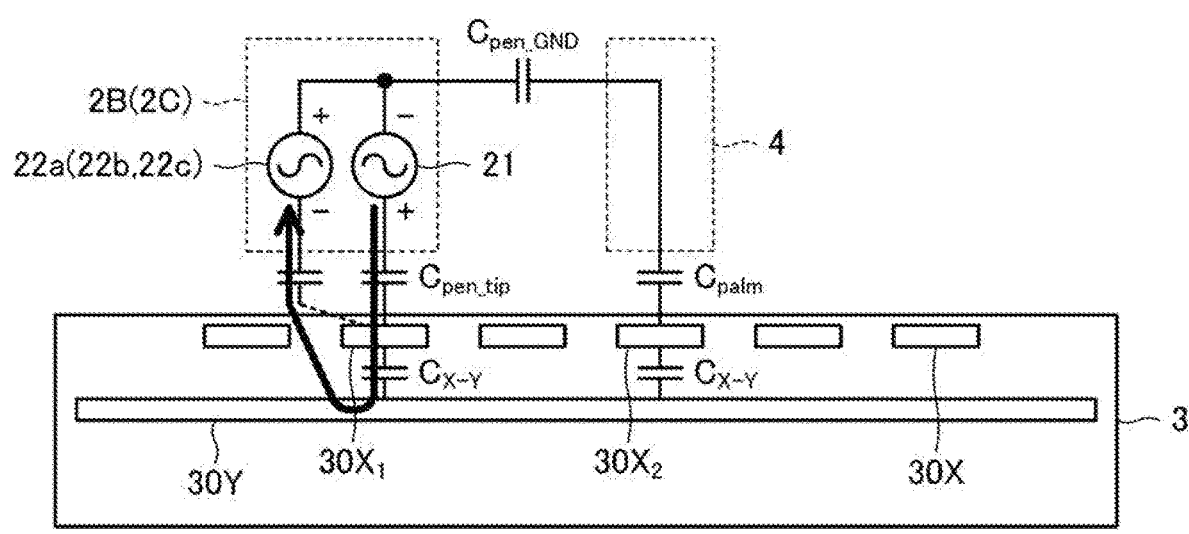

FIG. 14 is a diagram illustrating an equivalent circuit similar to FIG. 13B regarding the case in which the active pen 2B transmits the reverse-phase signal of the downlink signal DS from the peripheral electrode 22a. As indicated by parentheses in FIG. 14, the equivalent circuit is also similar in the case where the active pen 2C transmits the reverse-phase signals of the downlink signals DS from the peripheral electrodes 22b and 22c.

As illustrated in FIG. 14, when the reverse-phase signal of the downlink signal DS is transmitted from the peripheral electrode 22a, at least a portion of the downlink signal DS sent out from the pen tip electrode 21 and entering the sensor electrode 30Y is absorbed by the peripheral electrode 22a before reaching the sensor electrode $30X_2$. Therefore, the current induced in the sensor electrode $30X_2$ is reduced, and this prevents the sensor controller 31 from falsely detecting the contact position of the hand as the instruction position of the active pen 2. This is similar in the active pen 2C.

As described, according to the active pens 2B and 2C of the present embodiment, the reverse-phase signal of the downlink signal DS can be transmitted from the peripheral electrode at the same time as the transmission of the downlink signal DS from the pen tip electrode, and this allows the peripheral electrode to absorb the downlink signal DS otherwise absorbed by the hand of the user. This prevents the sensor controller 31 from falsely detecting the contact position of the hand as the instruction position of the active pen 2.

Next, a communication method that allocates time slots in a timely manner according to the functions of each active pen 2 and that is executed between the active pen 2 and the sensor controller 31 will be described. In the following description, flows of processes executed by the sensor controller 31 and the active pen 2 will be described first, and then specific details of a transmission schedule for allocating time slots in a timely manner according to the functions of each active pen 2 will be described.

Figure 15:
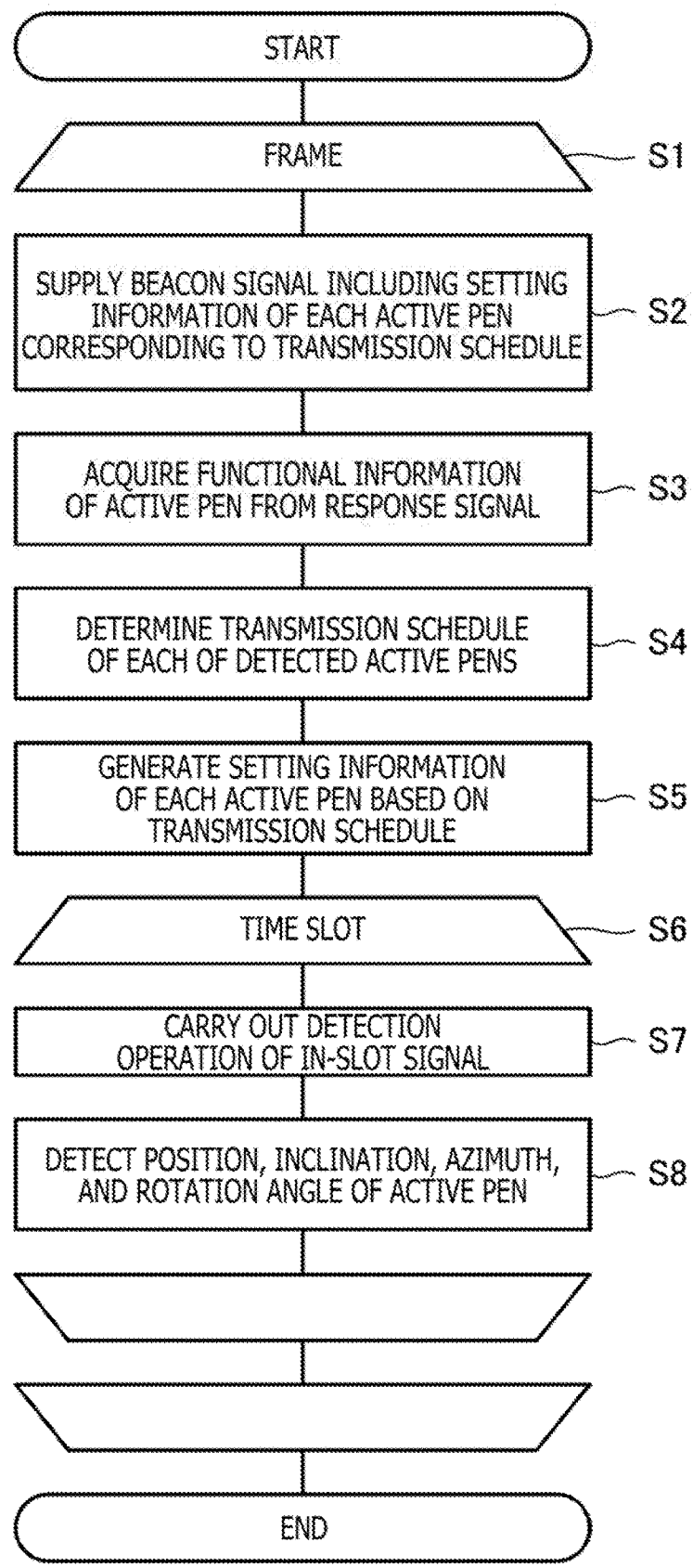
FIG. 15 is a flow chart illustrating a process of the sensor controller 31 according to an embodiment of the present disclosure.

FIG. 15 is a flow chart illustrating a flow of the sensor controller 31 according to the present embodiment. As illustrated in FIG. 15, the sensor controller 31 is configured to repeat processes of steps S2 to S7 for each frame including a plurality of time slots (step S1).

In step S2, the sensor controller 31 supplies the beacon signal BS to serve as a reference time for the frame to the sensor electrode group 30 (a beacon signal supply step). At this time, the sensor controller 31 arranges, in the beacon signal BS, the setting information for each active pen 2 necessary to execute the transmission schedule determined in step S4 of the previous cycle. As a result, the setting information is transmitted to each of one or more active pens 2 detected by the sensor controller 31 (a setting step).

The sensor controller 31 then detects the response signal returned from the active pen 2 in response to the beacon signal BS and acquires the functional information of the active pen 2 from the response signal (step S3, a functional information acquisition step). The sensor controller 31 determines the transmission schedule of each active pen 2 based on the functional information of each of one or more detected active pens 2 including the active pen 2 for which the functional information is newly acquired (step S4). The determination of the transmission schedule includes determination of the type of detection operation supported by each active pen 2 (e.g., the position detection, the inclination and azimuth detection, and the rotation angle detection), allocation of one or more time slots to each electrode based on the determination of the supported type of detection operation, and determination of the type of signal (downlink signal DS or reverse-phase signal of downlink signal DS) to be transmitted from the active pen 2 from each electrode in the allocated time slots. For example, when the active pen 2 is determined, based on its functional information, to have the peripheral electrode that is isotropic with respect to the rotation about the pen axis (for example, active pen 2B), the active pen 2 is determined to be capable of the position detection and the inclination and azimuth detection, and when the active pen 2 is determined, based on its functional information, to have the peripheral electrode that is anisotropic with respect to the rotation about the pen axis (for example, active pen 2C), the active pen 2 is determined to be capable of the position detection, the inclination and azimuth detection, and the rotation angle detection. As another example, it is determined whether or not to allocate one or more time slots to only the pen tip electrode 21, or to allocate one or more time slots to each of the pen tip electrode 21 and the peripheral electrode (an allocation determination step).

Next, the sensor controller 31 generates the setting information of each active pen 2 based on the result of the determination of step S4 (step S5). Specifically, the sensor controller 31 generates the setting information by selecting one of multiple sets of predefined setting information, to be described later. The sensor controller 31 is configured to arrange, in the beacon signal BS to be transmitted in step S2 in the next cycle, the setting information generated in this way.

The sensor controller 31 executes processes of steps S7 and S8 for each time slot included in the frame (step S6). Specifically, the sensor controller 31 first carries out the detection operation of the in-slot signal (step S7) and detects the position (x, y), the inclination θ, the azimuth φ, and the rotation angle ψ of the active pen 2 based on the result of the detection operation (step S8). The details of the detection are as described above.

Figure 16:
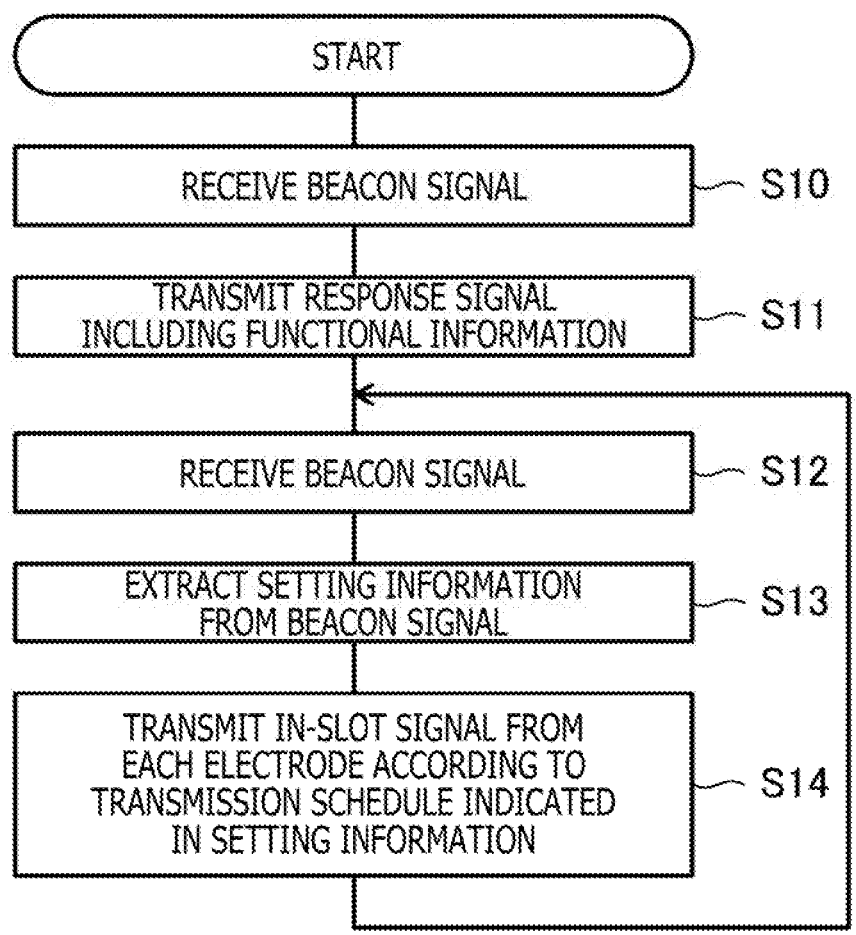
FIG. 16 is a flow chart illustrating a process of the active pen 2 according to an embodiment of the present disclosure.

FIG. 16 is a flow chart illustrating the process of the active pen 2 according to the present embodiment. As illustrated in FIG. 16, the active pen 2 first receives the beacon signal BS transmitted from the sensor controller 31 (step S10) and transmits the response signal in response to the beacon signal BS (step S11). At this point, the active pen 2 arranges, in the response signal, the functional information indicating the number, the shape, and the arrangement of the electrodes provided in the active pen 2. In this way, the functional information arranged in the response signal includes information indicating whether or not the active pen 2 includes the peripheral electrode.

When the active pen 2 receives the beacon signal BS again after the execution of step S11 (step S12), the active pen 2 extracts the setting information for the active pen 2 from the beacon signal BS (step S13). The active pen 2 then transmits the in-slot signal from each electrode according to the transmission schedule indicated in the extracted setting information (step S14).

FIG. 17 is a diagram illustrating an example of multiple sets of predefined setting information (to be selected in step S5 of FIG. 15). In FIG. 17, k is an integer equal to or greater than 2. In addition, the index is an identifier of the setting information, and "P," "T," "R1," and "R2" in the time slots correspond to the position detection, the inclination and azimuth detection, step R1 of the rotation angle detection, and step R2 of the rotation angle detection illustrated in FIG. 5, respectively. Hereinafter, an example of the setting information transmitted to the active pen 2C will be illustrated to describe content of the setting information.

Specifically, the setting information transmitted to the active pen 2C is information including signal content designation information, which specifies a first time slot set indicating one or more time slots to be allocated to the pen tip electrode 21, a second time slot set indicating one or more time slots to be allocated to the peripheral electrode 22b, and a third time slot set indicating one or more time slots to be allocated to the peripheral electrode 22c, and which specifies the content of the signal to be transmitted from the active pen 2C from each of the pen tip electrode 21 and the peripheral electrodes 22b and 22c in each time slot.

For example, the setting information of an index n (0≤n<k) specifies time slots such as $S_n$, $S_{k+n}$, and $S_{2k+n}$ as the first to third time slot sets, respectively. In this case, all of the specified time slots are used for the position detection (P), and the signal content designation information included in the setting information is information which designates the normal-phase signal of the in-slot signal as a signal to be transmitted from the pen tip electrode 21 and designates the reverse-phase signal of the in-slot signal as a signal to be transmitted from each of the peripheral electrodes 22b and 22c, in all of the specified time slots, as can be understood from FIG. 5. As a result, the active pen 2C transmits the normal-phase signal of the in-slot signal from the pen tip electrode 21 and transmits the reverse-phase signal of the in-slot signal from each of the peripheral electrodes 22b and 22c in each of the specified time slots, and the sensor controller 31 can accurately detect the position (x, y) of the active pen 2C in each time slot.

As another example, the setting information of an index k+n (0≤n<k) specifies time slots such as $S_n$, $S_{n+1}$, $S_{k+n}$, $S_{k+n+1}$, $S_{2k+n}$, and $S_{2k+n+1}$ as the first to third time slot sets. Furthermore, the signal content designation information included in the setting information is information which designates the normal-phase signal of the in-slot signal as a signal to be transmitted from the pen tip electrode 21 and the reverse-phase signal of the in-slot signal as a signal to be transmitted from each of the peripheral electrodes 22b and 22c in the time slots such as $S_n$, $S_{k+n}$, and $S_{2k+n}$ used for the position detection (P) and designates the normal-phase signal of the in-slot signal as a signal to be transmitted from each of the pen tip electrode 21 and the peripheral electrodes 22b and 22c in the time slots such as $S_{n+1}$, $S_{k+n+1}$, and $S_{2k+n+1}$ used for the inclination and azimuth detection (T). As a result, the active pen 2C transmits the normal-phase signal of the in-slot signal from the pen tip electrode 21 and transmits the reverse-phase signal of the in-slot signal from each of the peripheral electrodes 22b and 22c in the time slots such as $S_n$, $S_{k+n}$, and $S_{2k+n}$, and the sensor controller 31 can accurately detect the position (x, y) of the active pen 2C in each of the time slots. In addition, the active pen 2C transmits the normal-phase signal of the in-slot signal from each of the pen tip electrode 21 and the peripheral electrodes 22b and 22c in the time slots such as $S_{n+1}$, $S_{k+n+1}$, and $S_{2k+n+1}$, and the sensor controller 31 can detect the inclination θ and the azimuth φ of the active pen 2C in each of the time slots.

As another example, the setting information of an index 2k+n (0≤n<k) specifies time slots such as $S_n$, $S_{n+1}$, $S_{n+2}$, $S_{n+3}$, $S_{k+n}$, $S_{k+n+1}$, $S_{k+n+2}$, $S_{k+n+3}$, $S_{2k+n}$, $S_{2k+n+1}$, $S_{2k+n+2}$, and $S_{2k+n+3}$ as the first to third time slots. Furthermore, the signal content designation information included in the setting information is information which designates the normal-phase signal of the in-slot signal as a signal to be transmitted from the pen tip electrode 21 and the reverse-phase signal of the in-slot signal as a signal to be transmitted from each of the peripheral electrodes 22b and 22c in the time slots such as $S_n$, $S_{k+n}$, and $S_{2k+n}$ used for the position detection (P), designates the normal-phase signal of the in-slot signal as a signal to be transmitted from each of the pen tip electrode 21 and the peripheral electrodes 22b and 22c in the time slots such as $S_{n+1}$, $S_{k+n+1}$, and $S_{2k+n+1}$ used for the inclination and azimuth detection (T), designates the normal-phase signal of the in-slot signal as a signal to be transmitted from each of the pen tip electrode 21 and the peripheral electrode 22b and the reverse-phase signal of the in-slot signal as a signal to be transmitted from the peripheral electrode 22c in the time slots such as $S_{n+2}$, $S_{k+n+2}$, and $S_{2k+n+2}$ used for step R1 of the rotation angle detection, and designates the normal-phase signal of the in-slot signal as a signal to be transmitted from each of the pen tip electrode 21 and the peripheral electrode 22c and the reverse-phase signal of the in-slot signal as a signal to be transmitted from the peripheral electrode 22b in the time slots such as $S_{n+3}$, $S_{k+n+3}$, and $S_{2k+n+3}$ used for step R2 of the rotation angle detection. As a result, the active pen 2C transmits the normal-phase signal of the in-slot signal from the pen tip electrode 21 and transmits the reverse-phase signal of the in-slot signal from each of the peripheral electrodes 22b and 22c in the time slots such as $S_n$, $S_{k+n}$, and $S_{2k+n}$, and the sensor controller 31 can accurately detect the position (x, y) of the active pen 2C in each of the time slots. In addition, the active pen 2C transmits the normal-phase signal of the in-slot signal from each of the pen tip electrode 21 and the peripheral electrodes 22b and 22c in the time slots such as $S_{n+1}$, $S_{k+n+1}$, and $S_{2k+n+1}$, and the sensor controller 31 can detect the inclination θ and the azimuth φ of the active pen 2C in each of the time slots. Furthermore, the active pen 2C transmits the normal-phase signal of the in-slot signal from each of the pen tip electrode 21 and the peripheral electrode 22b and transmits the reverse-phase signal of the in-slot signal from the peripheral electrode 22c in the time slots such as $S_{n+2}$, $S_{k+n+2}$, and $S_{2k+n+2}$. The active pen 2C transmits the normal-phase signal of the in-slot signal from each of the pen tip electrode 21 and the peripheral electrode 22c and transmits the reverse-phase signal of the in-slot signal from the peripheral electrode 22b in the following time slots such as $S_{n+3}$, $S_{k+n+3}$, and $S_{2k+n+3}$. Therefore, the sensor controller 31 can calculate the rotation angle ψ of the active pen 2C after the end of each of the time slots such as $S_{n+3}$, $S_{k+n+3}$, and $S_{2k+n+3}$.

Here, the setting information that can be selected for the active pens 2A and 2B will be described. The active pen 2A does not support the detection of the inclination and the azimuth and the detection of the rotation angle, and it is preferable that the setting information to be selected by the sensor controller 31 include only the setting information corresponding to the index n (0≤n<k) in the setting information illustrated in FIG. 17. The active pen 2B does not support the detection of the rotation angle, and it is preferable that the setting information to be selected by the sensor controller 31 include only the setting information corresponding to the index n (0≤n<k) and the index k+n (0≤n<k) in the setting information illustrated in FIG. 17. In this way, the setting information that correspond to the functional information of each of the active pens 2A and 2B can be transmitted.

In addition, when the sensor controller 31 is detecting a plurality of active pens 2, it is preferable that the sensor controller 31 selects the setting information to prevent the active pens 2 from trying to transmit the signals in the same time slot, i.e., to avoid collision amongst the electrodes of the active pens 2. For example, when the sensor controller 31 is detecting one active pen 2A and one active pen 2C, the sensor controller 31 can, for example, transmit the setting information corresponding to the index 0 to the active pen 2A and transmit the setting information corresponding to the index 2k+1 to the active pen 2C. As another example, when the sensor controller 31 is detecting one active pen 2B and one active pen 2C, the sensor controller 31 can, for example, transmit the setting information corresponding to the index k to the active pen 2B and transmit the setting information corresponding to the index 2k+2 to the active pen 2C. In this way, one or more time slots can be allocated to each of the plurality of detected active pens 2 without creating collision amongst the electrodes of the active pens 2, to thereby properly calculate the position (x, y), the inclination θ, the azimuth φ, and the rotation angle ψ of each active pen 2.

As described above, according to the present embodiment, the sensor controller 31 can allocate time slots to electrodes (per electrode) according to the number of electrodes of each of one or more detected active pens 2. Therefore, the time slots can be allocated in a timely manner according to the functions of each active pen 2. As a result, the position (x, y), the inclination θ, the azimuth φ, and the rotation angle ψ of the active pen 2 can be calculated according to the number of electrodes of the active pen 2.

In the example of FIG. 17, the transmission rates of the in-slot signals differ among the setting information of the index n (0≤n<k) corresponding to only the detection of the position, the setting information of the index k+n (0≤n<k) corresponding to the detection of the position, the inclination, and the azimuth, and the setting information of the index 2k+n (0≤n<k) corresponding to the detection of the position, the inclination, the azimuth, and the rotation angle. However, the content of the setting information can be defined so as to set the transmission rates to be the same.

FIG. 18 is a diagram illustrating a first modification to the multiple sets of predefined setting information. In the present modification, the setting information of the index n (0≤n<k) is the same as the setting information illustrated in FIG. 17. The transmission rate of the active pen 2 based on this setting information is a rate of one transmission every k time slots (=1/k).

On the other hand, the setting information of the index k+n (0≤n<k) indicates that the time slots such as $S_n$ and $S_{2k+n}$ are used for the position detection (P), and the time slots such as $S_{k+n}$ and $S_{3k+n}$ are used for the inclination and azimuth detection (T). Therefore, the transmission rate of the active pen 2 based on this setting information is also a rate of one transmission every k time slots (=1/k) as in the case of the index n (0≤n<k).

The setting information of the index 2k+n (0≤n<k) indicates that the time slots such as $S_n$ and $S_{4k+n}$ are used for the position detection (P), the time slots such as $S_{k+n}$ and $S_{5k+n}$ are used for the inclination and azimuth detection (T), the time slots such as $S_{2k+n}$ and $S_{6k+n}$ are used for step R1 of the rotation angle detection, and the time slots such as $S_{3k+n}$ and $S_{7k+n}$ are used for step R2 of the rotation angle detection. Therefore, the transmission rate of the active pen 2 based on this setting information is also a rate of one transmission every k time slots (=1/k) as in the case of the index n (0≤n<k).

In this way, according to the present modification, the content of the setting information can be defined so as to set the transmission rate of the active pen 2 to a defined (e.g., fixed) value.

In addition, although the position detection, the inclination and azimuth detection, and the rotation angle detection are performed at the same frequency according to the example of FIG. 17, the detections may be executed at different frequencies.

FIG. 19A is a diagram illustrating a second modification to the predefined setting information. Although only the setting information of the index 2k is illustrated in FIG. 19A for simplicity, the same may be applied in the setting information of the other indices.

The setting information illustrated in FIG. 19A indicates that the time slots such as $S_k$, $S_{k+4}$, $S_{k+8}$, $S_{k+12}$, $S_{k+16}$, $S_{k+20}$, $S_{k+24}$, and $S_{k+28}$ are used for the position detection (P), the time slots such as $S_{k+2}$, $S_{k+10}$, $S_{k+18}$, and $S_{k+26}$ are used for the inclination and azimuth detection (T), the time slots such as $S_{k+6}$ and $S_{k+22}$ are used for step R1 of the rotation angle detection, and the time slots such as $S_{k+14}$ and $S_{k+30}$ are used for step R2 of the rotation angle detection. Therefore, execution frequencies of the position detection, the inclination and azimuth detection, and the rotation angle detection can be expressed as a ratio of 4:2:1.

In this way, according to the present modification, the content of the setting information can be defined so that the position detection, the inclination and azimuth detection, and the rotation angle detection are executed at different frequencies.

In the example of FIG. 19A, the position detection, the inclination and azimuth detection, step R1 of the rotation angle detection, and step R2 of the rotation angle detection are respectively executed at certain time intervals. Specifically, the position detection is executed every INT1 equivalent to time of four time slots, the inclination and azimuth detection is executed every INT2 equivalent to time of eight time slots, and steps R1 and R2 of the rotation angle detection are executed every INT3 equivalent to time of sixteen time slots. This can increase the accuracy of the ink data generated by the host processor 32 (see FIG. 1) according to the results of the position detection, the inclination and azimuth detection, and the rotation angle detection.

FIG. 19B is a diagram illustrating a modification to the second modification illustrated in FIG. 19A. In the modification, each of the inclination and azimuth detection, step R1 of the rotation angle detection, and step R2 of the rotation angle detection is executed in a time slot that is one time slot before the modification in FIG. 19A. This setting information in FIG. 19B can also execute the position detection, the inclination and azimuth detection, and the rotation angle detection at different frequencies, wherein the position detection, the inclination and azimuth detection, step R1 of the rotation angle detection, and step R2 of the rotation angle detection are executed at certain time intervals.

Although the sensor controller 31 determines the setting information for each of the active pens 2 in the example described in FIG. 17, one set of setting information may be determined in advance, and used with a plurality of active pens 2.

Figure 20:
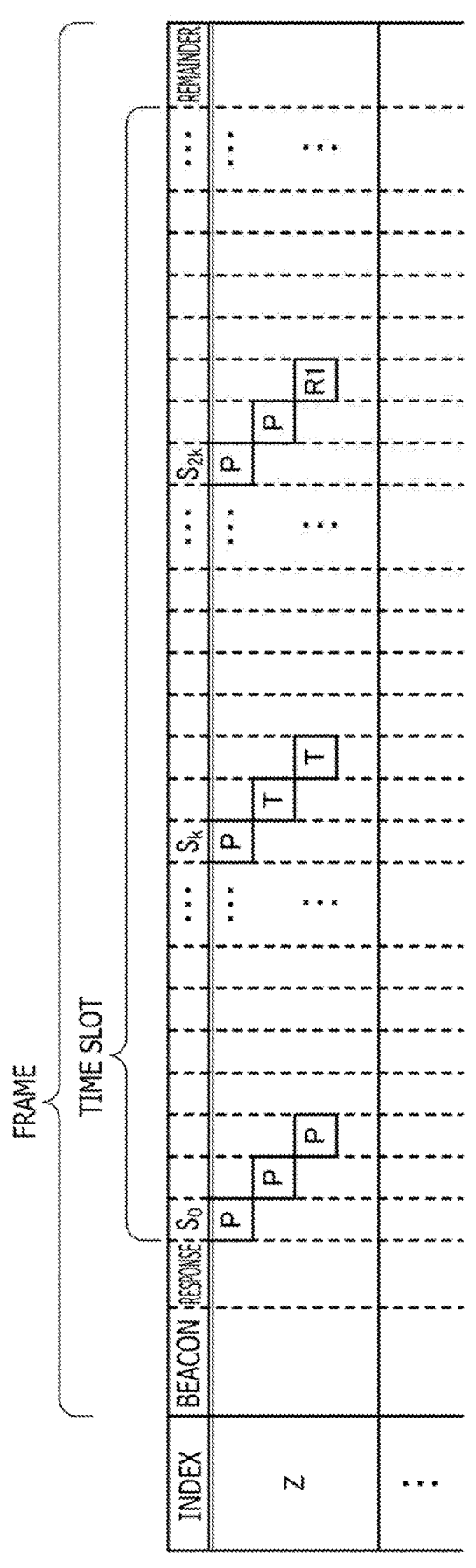

FIG. 20 is a diagram illustrating a third modification to the predefined setting information. An index Z illustrated in FIG. 20 is an example of the setting information corresponding to a plurality of active pens 2. According to the setting information, time slots such as $S_0$, $S_k$, and $S_{2k}$ are allocated to a first active pen 2, time slots such as $S_1$, $S_{k+1}$, and $S_{2k+1}$ are allocated to a second active pen 2, and time slots such as $S_2$, $S_{k+2}$, and $S_{2k+2}$ are allocated to a third active pen 2.

In this case, the content of the signal transmitted from each active pen 2 in each time slot may be determined according to the functional information of each active pen 2. For example, FIG. 20 illustrates an example in which the first active pen 2 is the active pen 2A, the second active pen 2 is the active pen 2B, and the third active pen 2 is the active pen 2C. As illustrated in FIG. 20, from the active pen 2A, the signal for the position detection (that is, a normal-phase signal of an in-slot signal transmitted from pen tip electrode 21) is transmitted in each time slot. From the active pen 2B, the signals for the position detection (that is, a normal-phase signal of an in-slot signal transmitted from pen tip electrode 21 and a reverse-phase signal of an in-slot signal transmitted from peripheral electrode 22a) and the signals for the inclination and azimuth detection (that is, normal-phase signals of in-slot signals transmitted from pen tip electrode 21 and peripheral electrode 22a) are alternately transmitted. From the active pen 2C, the signals for the position detection (that is, a normal-phase signal of an in-slot signal transmitted from pen tip electrode 21 and reverse-phase signals of in-slot signals transmitted from peripheral electrodes 22b and 22c), the signals for the inclination and azimuth detection (that is, normal-phase signals of in-slot signals transmitted from pen tip electrode 21 and peripheral electrodes 22b and 22c), the signals for step R1 of the rotation angle detection (that is, normal-phase signals of in-slot signals transmitted from pen tip electrode 21 and peripheral electrode 22b and a reverse-phase signal of an in-slot signal transmitted from peripheral electrode 22c), and the signals for step R2 of the rotation angle detection (that is, normal-phase signals of in-slot signals transmitted from pen tip electrode 21 and peripheral electrode 22c and a reverse-phase signal of an in-slot signal transmitted from peripheral electrode 22b) are repeatedly transmitted in this order. Such a transmission method according to the functional information can be predefined such that the sensor controller 31 can perform the detection operation according to the content of the signal transmitted from the active pen 2. Therefore, the position detection, the inclination and azimuth detection, and the rotation angle detection of each active pen 2 can be suitably executed.

Although the preferred embodiments of the present embodiment have been described, the present disclosure is not limited to the described embodiments, and the present disclosure may be carried out in various modes without departing from the scope of the present disclosure.

For example, although each of the active pens 2 transmits the downlink signals DS in time slots in the example of the system described in the embodiments, the present disclosure can also be applied in a system that does not use time slots. For example, the present disclosure can be applied in a system in which the beacon signal BS includes information designating only which active pen 2 is to transmit which signal content, and the designated active pen 2 transmits the signal including the designated content at arbitrary timing.

In addition, although one or more time slots for the active pen 2 to transmit signals are specified in the beacon signal BS in the example of the system described in the embodiments, the present disclosure can also be applied in a system that does not use the beacon signal BS. For example, each of the active pens 2 can respond to a predetermined trigger provided by a built-in timer (not illustrated) to transmit the signals from the electrodes in the order determined in advance between the active pen 2 and the sensor controller 31.

The functional information may include, for example, information indicating the positional relationship between the pen tip electrode and the peripheral electrode, information indicating the angle of the peripheral electrode with respect to the pen axis, and the like, in addition to the number, the shape, and the arrangement of the electrodes provided in the active pen 2C. In this case, the sensor controller 31 can calculate the inclination, the azimuth, and the rotation angle based also on the additionally included information to more accurately obtain the inclination, the azimuth, and the rotation angle of the active pen 2.

The functional information may include, for example, an electrode characteristic profile identifier which identifies one of a plurality of electrode characteristic profiles predefined for the peripheral electrode. The sensor controller 31 may determine, based on the electrode characteristic profile identifier, the type of detection operation (i.e., one or more of the position detection, the inclination and azimuth detection, and the rotation angle detection) to be performed for the active pen 2. The plurality of electrode characteristic profiles may include, for example, an electrode characteristic profile indicating that the peripheral electrode is isotropic with respect to the rotation about the pen axis, and an electrode characteristic profile indicating that the peripheral electrode is anisotropic with respect to the rotation about the pen axis. The functional information can specify the information described above in a different manner, such as by including a pen ID or a pen type ID.

Although it is assumed in the description of the embodiments that the setting information is included and transmitted in one beacon signal BS, the setting information may be segmented and transmitted in a plurality of beacon signals BS. For example, a first part which specifies the first time slot set in the setting information and a second part which specifies the second time slot set in the setting information may be included and transmitted in different beacon signals BS. In this case, the first part may include information regarding the length of time required to transmit the signals using the first time slot set, and the second part may include information regarding the length of time required to transmit the signals using the second time slot set. The active pen 2 may transmit a response signal from the pen tip electrode 21 or the peripheral electrode when the active pen 2 receives the beacon signal BS including the second part.

The setting information may include information which specifies the type of detection operation supported by the sensor controller 31 (for example, information indicating whether or not sensor controller 31 supports inclination detection using a peripheral electrode). The active pen 2 can use this information to select the type of signal to be transmitted to the sensor controller 31.

Although the time slot is allocated to each electrode of each active pen 2 in the description of the embodiments, other units of communication resources expressed in terms of a combination of one or more of a frequency, a code, and a time slot may be allocated, when the signals transmitted or received in the same time slot can be distinguished by varying frequencies or by varying codes. In this case, the same time slot may be allocated to different electrodes.

Although the active pen 2C including two peripheral electrodes 22a and 22b obtained by segmenting the peripheral electrodes 22a into two parts along a plane including the pen axis is described as an example of the active pen 2 that supports the detection of the rotation angle, any active pen 2 including peripheral electrodes in anisotropic shapes with respect to the rotation about the pen axis can detect the rotation angle.

Figure 21A:
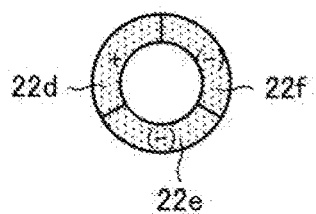
FIGS. 21A-21C are diagrams illustrating peripheral electrodes 22d to 22f included in the active pen 2 according to a modification to the embodiment of the present disclosure.
Figure 21B:
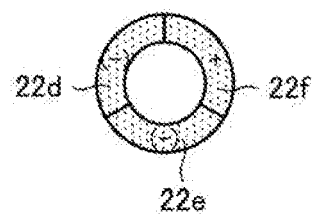
Figure 21C:
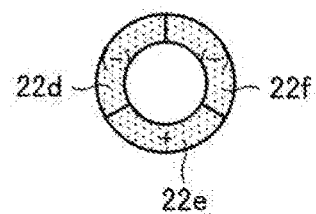

FIGS. 21A-21C are diagrams illustrating peripheral electrodes 22d to 22f included in the active pen 2 according to a modification to the embodiment of the present disclosure. The active pen 2 according to the present modification includes three peripheral electrodes 22d to 22f obtained by dividing the peripheral electrode 22a of the active pen 2B into three equal parts as illustrated in FIGS. 21A-21C. The peripheral electrodes 22d to 22f have anisotropic shapes with respect to the rotation about the pen axis, and the active pen 2 according to the present modification can detect the rotation angle.

FIGS. 21A to 21C also illustrate an example of signals transmitted from each of the peripheral electrodes 22d to 22f when the active pen 2 according to the present modification is used to detect the rotation angle. The meaning of "+," "−,"

and parentheses as indicated in FIGS. 21A to 21C are the same as the meaning in FIG. 5.

Three positions corresponding to the peripheral electrodes 22d to 22f on the XY plane can be obtained by performing the following: a step of transmitting the normal-phase signal of the downlink signal DS from the peripheral electrode 22d and transmitting the reverse-phase signals of the downlink signal DS from the peripheral electrodes 22e and 22f (FIG. 21A), a step of transmitting the normal-phase signal of the downlink signal DS from the peripheral electrode 22e and transmitting the reverse-phase signals of the downlink signal DS from the peripheral electrodes 22d and 22f (FIG. 21B), and a step of transmitting the normal-phase signal of the downlink signal DS from the peripheral electrode 22f and transmitting the reverse-phase signals of the downlink signal DS from the peripheral electrodes 22d and 22e (FIG. 21C). The sensor controller 31 can calculate the rotation angle of the triangle defined by the three positions to thereby detect the rotation angle ψ of the active pen 2.

As in the description regarding the active pen 2C, transmission of the reverse-phase signal from each peripheral electrode may be replaced with no signal transmission. In this case, only one of the two peripheral electrodes that are set to transmit the reverse-phase signals in each of FIGS. 21A to 21C may be configured not to transmit any signal. For example, the peripheral electrode 22e need not transmit a signal in FIG. 21A, the peripheral electrode 22d need not transmit a signal in FIG. 21B, and the peripheral electrode 22f need not transmit a signal in FIG. 21C. In this case also, three positions can be similarly used to calculate the rotation angle ψ of the active pen 2.

DESCRIPTION OF REFERENCE SYMBOLS

1 Position detection system
2, 2A to 2C Active pen
3 Tablet terminal
3a Panel surface
4 Human body
20 Signal processor
21 Pen tip electrode
22a to 22c Peripheral electrode
30 Sensor electrode group
30X, 30Y Sensor electrode
31 Sensor controller
32 Host processor
40 to 42 Switching unit
43 Detection unit
43a Waveform reproduction unit
43b Correlation calculator
44 Control unit
45 Transmission unit
46 Reverse-phase signal generation unit
51 Logic unit
52, 53 Transmission unit
54 Reception unit
55 Selection unit
61 Preamble supply unit
62 Switch
63 Code sequence holding unit
64 Spread processor
65 Transmission guard unit
68x, 68y Switch
69x, 69y Conductor selection circuit
70 Amplifier circuit
71 Detection circuit
72 Analog-digital converter BS Beacon signal
COM Command
DS Downlink signal
EN Start signal
Finger detection signal
PRE Preamble
SWC1 to SWC3 Control signal
Vcom Common potential
ctrl_t1 to ctrl_t4,
ctrl_r, sTRx,
sTRy, selX, selY Control signal

The invention claimed is:

1. A communication method executed between:
one of a first active pen including a pen tip electrode and a second active pen including a pen tip electrode and a peripheral electrode; and
a sensor controller connected to a sensor electrode,
the communication method comprising:
a beacon signal supply step in which the sensor controller supplies a beacon signal which serves as a reference time for a frame formed of a plurality of time slots;
a functional information acquisition step in which the sensor controller acquires, from a downlink signal returned from one of the first active pen and the second active pen in response to the beacon signal, functional information indicating whether or not one of the active pens that has transmitted the downlink signal includes the peripheral electrode; and
an allocation determination step in which the sensor controller determines based on the acquired functional information whether to allocate one or more of the time slots to only the pen tip electrode of the first or second active pen or to allocate one or more of the time slots to each of the pen tip electrode of the first or second active pen and the peripheral electrode of the second active pen.

2. The method according to claim 1, comprising:
a setting step in which the sensor controller transmits, to the one of the active pens, setting information which specifies a first time slot set indicating one or more of the time slots allocated to the pen tip electrode of the first or second active pen and a second time slot set indicating one or more of the time slots allocated to the peripheral electrode when the sensor controller determines to allocate one or more of the time slots to each of the pen tip electrode of the first or second active pen and the peripheral electrode of the second active pen in the allocation determination step.

3. The method according to claim 2, wherein the setting information includes information which designates content of a signal to be transmitted from the one of the active pens from each of the pen tip electrode of the first or second active pen and the peripheral electrode of the second active pen.

4. The method according to claim 2, comprising:
a step in which the second active pen uses one or more of the time slots in the first time slot set to transmit a downlink signal from the pen tip electrode of the second active pen; and
a step in which the second active pen uses one or more of the time slots in the second time slot set to transmit a downlink signal from the peripheral electrode.

5. The method according to claim 1, wherein
the functional information includes at least one of information indicating a shape of the peripheral electrode, information indicating a positional relationship between the pen tip electrode of the first or second active pen and the peripheral electrode of the second active pen, information indicating an angle of the peripheral electrode with respect to a pen axis, and information indicating a number of peripheral electrodes, and the sensor controller detects at least one of an inclination and a rotation angle of the second active pen on the basis of the functional information.

6. The method according to claim 5, wherein
the functional information includes information indicating whether the peripheral electrode is isotropic or anisotropic with respect to the rotation about the pen axis, and the sensor controller detects the inclination of the second active pen when the functional information indicates that the peripheral electrode is isotropic with respect to the rotation about the pen axis and detects the rotation angle of the second active pen when the functional information indicates that the peripheral electrode is anisotropic with respect to the rotation about the pen axis.

7. The method according to claim 1, wherein
the functional information includes an electrode characteristic profile identifier which identifies one of a plurality of electrode characteristic profiles predefined for the peripheral electrode, and the sensor controller detects at least one of the inclination and the rotation angle of the second active pen on the basis of the electrode characteristic profile identifier.

8. The method according to claim 2, wherein in the setting step, the setting information is included and transmitted in the one beacon signal.

9. The method according to claim 8, wherein in the setting step, an identifier which identifies one of multiple sets of predefined setting information is transmitted as the setting information.

10. The method according to claim 8, wherein the setting information includes information indicating whether or not the sensor controller supports inclination detection using the peripheral electrode.

11. The method according to claim 2, wherein in the setting step, a first part which specifies the first time slot set in the setting information and a second part which specifies the second time slot set in the setting information are included and transmitted in different beacon signals.

12. The method according to claim 11, wherein
the first part includes information which specifies a length of time required to transmit signals using the first time slot set, and the second part includes information which specifies a length of time required to transmit signals using the second time slot set.

13. The method according to claim 12, comprising:
a step in which one of the active pens transmits a response signal to the beacon signal including the second part from the pen tip electrode of the one of the active pens.

14. The method according to claim 12, comprising:
a step in which one of the active pens transmits a response signal to the beacon signal including the second part from the peripheral electrode.

15. An active pen that transmits, through coupling capacitance, a signal to a sensor electrode connected to a sensor controller, the active pen comprising:
a pen tip electrode provided on a leading end in a pen axis direction of the active pen;
a peripheral electrode provided behind in the pen axis direction as viewed from the pen tip electrode; and
a signal processor that, in response to a beacon signal from the sensor controller, the beacon signal serving as a reference time for a frame formed of a plurality of time slots, transmits a downlink signal from the pen tip electrode and transmits a reverse-phase signal of the downlink signal from the peripheral electrode at the same time,
wherein the downlink signal is used by the sensor controller to determine that the active pen includes both the pen tip electrode and the peripheral electrode and to allocate one or more of the plurality of time slots to the pen tip electrode and the peripheral electrode of the active pen.

16. The active pen according to claim 15, wherein the signal processor stops transmitting the reverse-phase signal from the peripheral electrode according to a predetermined trigger.

17. The active pen according to claim 15, wherein the signal processor starts to transmit the downlink signal from the pen tip electrode according to a predetermined trigger.

18. The active pen according to claim 15, wherein
the peripheral electrode includes a plurality of segmented electrodes, and
the signal processor is capable of individually switching each of the plurality of segmented electrodes to transmit the downlink signal or to transmit the reverse-phase signal.

19. The active pen according to claim 18, wherein the signal processor uses a predetermined communication method to notify the sensor controller that the peripheral electrode includes the plurality of segmented electrodes.

20. The active pen according to claim 16, wherein the predetermined trigger is provided by a timer built in the active pen.

21. The active pen according to claim 16, wherein the predetermined trigger is provided by a beacon signal transmitted from the sensor controller.

* * * * *